United States Patent
Hugg et al.

(10) Patent No.: US 8,775,535 B2
(45) Date of Patent: Jul. 8, 2014

(54) SYSTEM AND METHOD FOR THE TRANSMISSION AND MANAGEMENT OF SHORT VOICE MESSAGES

(75) Inventors: Steven Hugg, Cocoa Beach, FL (US); Jennifer Harvey, Cocoa Beach, FL (US)

(73) Assignee: Voxilate, Inc., Wilmington, DE (US)

( * ) Notice: Subject to any disclaimer, the term of this patent is extended or adjusted under 35 U.S.C. 154(b) by 220 days.

(21) Appl. No.: 13/352,337

(22) Filed: Jan. 18, 2012

(65) Prior Publication Data

US 2012/0185547 A1 Jul. 19, 2012

Related U.S. Application Data

(60) Provisional application No. 61/433,732, filed on Jan. 18, 2011.

(51) Int. Cl.
*G06F 15/16* (2006.01)

(52) U.S. Cl.
USPC ........... 709/206; 703/203; 703/204; 703/205; 703/231; 703/237; 455/412; 455/415; 455/457; 455/466

(58) Field of Classification Search
USPC ......... 709/205, 206, 231, 203, 204, 237, 250; 455/412, 415, 457, 466
See application file for complete search history.

(56) References Cited

U.S. PATENT DOCUMENTS

| | | | |
|---|---|---|---|
| 6,578,070 B1 * | 6/2003 | Weaver et al. | 709/206 |
| 7,107,017 B2 | 9/2006 | Koskelainen et al. | |
| 7,170,863 B1 | 1/2007 | Denman et al. | |
| 7,353,034 B2 | 4/2008 | Haney | |
| 7,450,934 B2 | 11/2008 | Caspi et al. | |
| 7,519,730 B2 * | 4/2009 | Bailey et al. | 709/237 |
| 7,536,470 B2 * | 5/2009 | Li et al. | 709/231 |
| 7,546,134 B2 | 6/2009 | Dunko | |
| 7,558,222 B2 | 7/2009 | Thadasina et al. | |
| 7,603,413 B1 * | 10/2009 | Herold et al. | 709/204 |
| 7,692,579 B2 | 4/2010 | Vassilovski | |
| 7,831,269 B2 | 11/2010 | Jin et al. | |
| 7,917,589 B2 * | 3/2011 | Kronlund et al. | 709/206 |
| 7,937,443 B2 * | 5/2011 | Curry et al. | 709/206 |
| 7,970,425 B2 | 6/2011 | Balachandran et al. | |

(Continued)

OTHER PUBLICATIONS

Author Unkown; Get Push to Talk on your smartphone!; http://itunes.apple.com/us/app/tikl-touch-to-talk/id396612714?mt=8; Feb. 3, 2011; TiKL, Inc.; published on the internet.

(Continued)

*Primary Examiner* — Thu Ha Nguyen
(74) *Attorney, Agent, or Firm* — Stephen C. Thomas

(57) ABSTRACT

A system and method for exchanging short voice messages between devices connected to a network is provided. This system includes server components that are capable of being connected to a network and support the transmission, receipt, storage, and playback of short voice messages and location information. This system can also include software clients installed on mobile devices, desktop computers, and/or other remote computers that are connected to a network. These clients may also support voice modification of transmitted audio. This method enables asynchronous communication such that users may transmit voice messages and/or locations to recipients and the recipients may be alerted that messages have arrived, even if their clients are not active. The system of the invention provides privacy to the users of the system by allowing for multi-level privacy and trust settings, and by concealing a sending client's IP address from the receiving client.

23 Claims, 13 Drawing Sheets

(56) References Cited

U.S. PATENT DOCUMENTS

| | | | |
|---|---|---|---|
| 7,983,198 B2 | 7/2011 | Chow et al. | |
| 7,983,199 B1 | 7/2011 | Nguyen et al. | |
| 7,983,678 B2 | 7/2011 | Feher | |
| 8,566,470 B2* | 10/2013 | Chen et al. | 709/231 |
| 2002/0016163 A1* | 2/2002 | Burgan et al. | 455/412 |
| 2002/0194288 A1* | 12/2002 | Krueger et al. | 709/206 |
| 2003/0172116 A1* | 9/2003 | Curry et al. | 709/206 |
| 2004/0128198 A1* | 7/2004 | Register et al. | 705/14 |
| 2004/0230659 A1* | 11/2004 | Chase | 709/206 |
| 2005/0033855 A1* | 2/2005 | Moradi et al. | 709/231 |
| 2005/0262204 A1* | 11/2005 | Szeto et al. | 709/206 |
| 2006/0046741 A1 | 3/2006 | Loesch | |
| 2006/0046759 A1 | 3/2006 | Yoon et al. | |
| 2006/0172755 A1 | 8/2006 | Park | |
| 2006/0205428 A1 | 9/2006 | Wajda et al. | |
| 2006/0211383 A1 | 9/2006 | Schwenke et al. | |
| 2006/0232663 A1 | 10/2006 | Gandhi et al. | |
| 2007/0004438 A1 | 1/2007 | Brusilovsky et al. | |
| 2008/0065735 A1* | 3/2008 | Szeto et al. | 709/206 |
| 2008/0195761 A1* | 8/2008 | Jabri et al. | 709/250 |
| 2009/0017842 A1 | 1/2009 | Fukasaku | |
| 2009/0182587 A1 | 7/2009 | Lewis | |
| 2009/0204719 A1* | 8/2009 | Simongini et al. | 709/231 |
| 2009/0325546 A1 | 12/2009 | Reddy et al. | |
| 2009/0328236 A1* | 12/2009 | Schmelzer | 726/30 |
| 2010/0022255 A1 | 1/2010 | Singhal | |
| 2010/0125735 A1* | 5/2010 | Zapata et al. | 713/170 |
| 2010/0146055 A1* | 6/2010 | Hannuksela | 709/206 |
| 2010/0241711 A1* | 9/2010 | Ansari et al. | 709/205 |
| 2010/0281178 A1* | 11/2010 | Sullivan | 709/231 |
| 2011/0145726 A1* | 6/2011 | Wei et al. | 715/752 |
| 2012/0015675 A1* | 1/2012 | Suetsugu et al. | 455/457 |
| 2012/0165047 A1* | 6/2012 | Dolenc | 455/466 |
| 2013/0035107 A1* | 2/2013 | Chan et al. | 455/453 |
| 2013/0225139 A1* | 8/2013 | Moran et al. | 455/415 |
| 2014/0025836 A1* | 1/2014 | Gupta | 709/231 |

OTHER PUBLICATIONS

Kash, Wyatt; New app turns smart phone into secure two-way radio; Government Computer News; Mar. 16, 2010; http://gcn.com/articles/2010/03/16/new-app-turns-smartphones-into-secure-two-way-radio.aspx; published on the internet.

Author Unknown; iPTT push-to-talk; http://itunes.apple.com/us/app/iptt-push-to-talk/id311931218?mt=8; Oct. 20, 2011; Circle Apps, LLC; published on the internet.

Author Unknown; HipVoice Universal Push-To-Talk; date unknown (downloaded from internet Dec. 11, 2011); published on the internet.

Michaluk, Kevin; Now Available: HipVoice Push to Talk for Blackberry!; http://crackberry.com/now-available-hipvoice-push-talk-blackberry; Crackberry.com; Jun. 9, 2009; published on the internet.

* cited by examiner

SYSTEM AND METHOD FOR THE TRANSMISSION AND MANAGEMENT OF SHORT VOICE MESSAGES

CROSS REFERENCE TO RELATED APPLICATIONS

This non-provisional application claims the benefit of provisional patent application Ser. No. 61/433,732, filed with the United States Patent and Trademark Office on Jan. 18, 2011, which is incorporated herein by reference in its entirety.

INCORPORATION-BY-REFERENCE OF MATERIAL SUBMITTED ON A COMPACT DISK

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed to a messaging system and/or method which enables short messages, for example, but not limited to audio messages, to be transmitted from one user of the system or method to another user of the system or method on an asynchronous, non-interrupt basis using, for example, internet connectivity as a network medium. Push To Talk functionality is combined with an asynchronous, non-interruptive protocol that allows a user of the system to download messages, such as, but not limited to, audio messages, for listening or viewing on a handheld device such as a mobile phone.

2. Background Art

Various communication systems utilizing Push to Talk ("PTT") functionality have been known in the art. For example, U.S. Pat. No. 7,107,017 (2006) to Koskelainen et al. teaches a system, apparatus, and method for introducing services into a PTT environment. Requests for services are generated and transmitted via requesting PTT clients. The request is received at a PTT server, which forwards the request to a PTT application server recognized by the PTT server as another PTT client. The requested service is performed at the PTT application server, and a result is generated in response. The result is transmitted from the PTT application server to the requesting PTT client by way of the PTT server.

Another example PTT system is taught in U.S. Pat. No. 7,170,863 to Denman et al. (2007) which discloses a system and method for PTT service to another user via a wireless packet data network. One embodiment of the system taught in this U.S. patent includes a packet data network with at least one mobile station, a radio access network, a database server, a registrar and location server, an Interactive Multimedia Server (IMS), and a PTT server that provides PTT service to other PTT users on the packet network.

Still another system utilized for PTT services and incorporating geolocation functionality is taught in U.S. Pat. No. 7,546,134. This U.S. patent discloses a processor configured to detect a PTT event and trigger a location operation responsive to the PTT event. According to one exemplary embodiment, the processor determines a location of the wireless communication device and/or one or more remote wireless communication devices when the processor detects a floor control event. According to another embodiment of the 7,546,134 invention, the processor determines a location of the wireless communication device and/or one or more remote wireless communication devices when the processor detects a session entrance event. As a result, a user may use location information about the wireless communication device and/or a remote wireless communication device to facilitate PTT communications.

Most PTT implementations are half duplex communication systems which, by definition, allow only one user to transmit at a time. Because only one user can transmit at a time, there must necessarily exist a protocol for determining which user of such PTT systems has authority to transmit and which user does not have authority to transmit at any given time. This control of transmit authority is generally termed "floor control". Floor control can become a complicated protocol in group PTT applications and may require a complicated scheme of token passing, handshaking, or other methods for determining which user of the system has transmit authority. A drawback of current PTT systems is that they operate in real time, which means the users of such systems must participate in the communication as it is occurring. This real time requirement causes the PTT system to be interruptive in nature because it requires the user to focus on the messaging at the time the messaging occurs. If an intended recipient is not active in the PTT exchange, that user will miss the intended message. Because of the nature of PTT systems, users of such systems must cease other activities at the time of message exchange in order to focus on receipt of messages intended for them. Such interruptive communication can be distracting, and even dangerous, in certain work environments. The present invention overcomes this disadvantage of the prior art.

Furthermore, traditional PTT systems transmit voice data directly between mobile devices rather than mediating through an intermediate message broker. Such PTT systems have low latency and responsiveness, but as a consequence of this design, users that are offline will not be able to receive messages addressed to them. These systems have other drawbacks, such as being susceptible to network interference and exposing private information in the form of network addresses.

Voice messaging systems such as voice mail have existed for decades. Such voice mail systems are typically implemented on either a landline or cellular network, or may be internet based, as in, for instance, Voice over IP (VoIP) systems. Such voice messaging systems store messages intended for recipients that are offline. However, voice mail systems use a wholly different mechanism for real-time communication (in other words, a phone call) than they do for retrieval of stored messages, which is done using either a visual interface or a menu-based dial-in system. This prevents users from receiving messages as they are being recorded, and requires them to shift communication modalities when listening to a live conversation vs. a recorded message. Some PBX voice mail systems allow an authorized user to listen to voice messages while they are being recorded, however this always requires a different modality than a normal conversation.

Furthermore, text messaging systems, or Short Messaging Systems (SMS), are well known for the transmission and receipt of short text messages using the cellular telephone backbone. These systems, while useful and non-interruptive, do not allow for communication of non-text parameters such as speech inflection, pauses or changes in rate of speech, and other variation in speech patterns which can be extremely important in interpersonal communication. Text message systems also require focus and concentration upon the keyboard of the mobile client device and therefore require both visual and tactile concentration, which can prohibit the user from effectively completing other tasks such as driving an automobile, performing physical tasks, or even walking.

What is needed, then, is an internet-based system for short message communication that, among other things, allows for the transmission and playback of short audio messages on an asynchronous basis while at the same time requiring minimal tactile interaction with the user of a mobile device and providing privacy in the form by concealing network addresses. Such asynchronous communication would allow the recipient to download and playback short audio messages at the time and place of their choosing, would allow for non-interruptive communications, and would allow for the use of voice inflection and similar parameters to increase the effectiveness of communication over text-based systems. Such a system would also allow offline users to retrieve messages at their convenience: i.e. it would allow users of the system to receive their messages without necessitating their participation in the conversation on a real-time basis.

BRIEF SUMMARY OF THE INVENTION

The present invention comprises a messaging system and/or method that has one or more of the following features and/or steps, which alone or in any combination may comprise patentable subject matter. One embodiment of the present invention comprises a PTT functionality, message appending, total talk time per recipient limitation, multi-level trust indication, multi-level privacy settings, and a temporary lockout on sending new messages after a certain number of messages intended for a recipient have been received at the server but not yet downloaded by the recipient, or, alternatively, after a maximum recorded message time has been reached for messages stored on the server of the system which have not yet been downloaded by the intended recipient. The present invention utilizes the same mechanism for retrieving a message that is in the process of being sent as it does a message that has been stored, allowing for a simpler client and networking design and increasing usability for the end user. While the present invention is described herein as supporting audio messages, it is understood that the short messages may comprise video, combinations of audio and video, or other content.

DETAILED DESCRIPTION OF THE INVENTION

Embodiments of the present invention may provide methods and systems enabling device-to-device voice communication using short voice messages received from devices connected to a network. Embodiments of the invention may include server components capable of being connected to a network and supporting the transmission, receipt, storage, and playback of short voice messages and the transmission, receipt, and display of location information. Embodiments of the invention may also include software clients installed on mobile devices, desktop computers, and/or other remote computers operable to be connected to a network and/or the server. Embodiments of the invention may enable asynchronous communication such that users may transmit voice messages and/or locations to recipients, and the recipients may be alerted that messages have arrived, even if their clients are not active. Recipients may be able to choose to listen and/or respond immediately or wait until a later time.

Figure 1:
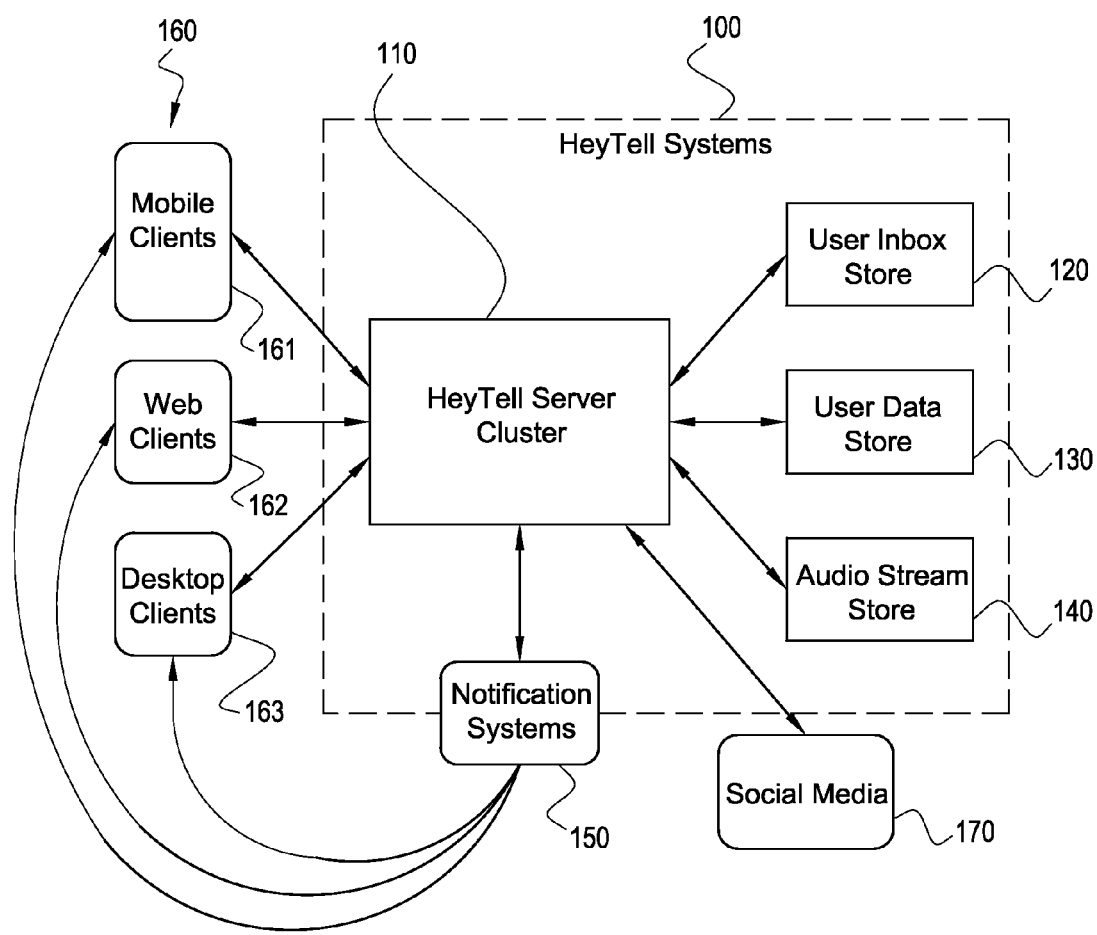
FIG. 1 depicts a system architectural diagram according to an embodiment of the invention.

FIG. 1 is an architectural diagram including server and client interaction and system components according to an embodiment of the present invention. A system 100 may include a server cluster 110. The server cluster 110 may include one or more servers comprising processors, data storage devices, and interfaces enabling connection to a network such as the Internet or a local network. The server cluster 110 may provide a transport mechanism for voice messages. The server cluster 110 may be divided logically into components that may include: primary connection mechanism, configuration and user information data store, transient message data store, data cache for access to configuration and message data, push and notification server, external service connectors (which may allow the system to directly interface with external services for SMS notifications, email notifications, social network notifications, external audio publishing mechanisms, and alert notification systems for mobile devices such as Apple® Push Notification servers or Google® Cloud-to-Device Messaging servers), and/or other components. In some embodiments, some or all of these components may be actual physical components separate from the server cluster 110 but in communication with the server cluster 110. For example, in FIG. 1, user inbox store 120, user data store 130, audio stream store 140, and notification systems 150 are presented as separate from the server cluster 110 itself.

Mobile clients 160 may communicate user contact information, privacy settings, voice messages, and/or other data to the server cluster 110. User contact information and privacy settings may be used to determine whether one client 160 can send voice messages to another client 160. Voice messages may be transmitted to the server cluster 110 where they may be dispatched to the intended recipient and/or stored (for example when the intended recipient is offline) until the recipient can retrieve them, at which point they may be transmitted to the recipient and marked for deletion. When a user sends a voice message to a contact, it is transmitted to the server cluster 110. The server cluster 110 may ensure that the message is being sent to a valid contact and accept it if so. The server cluster 110 may dispatch a message to the notification system 150 in use by the recipient, which may be a component of the system 100 or an external notification system (for example, the notification system 150 may comprise Apple Push Notification servers, Google Cloud-to-Device Messaging servers, or native push messaging and notification systems for clients that do not support either of these or any other external messaging mechanisms). The server cluster 110 may have storage for user inboxes 120, user data 130 used for authentication and connection to other users, audio streams 140, and/or other data. The server cluster 110 may interface with social media 170. For example, when a client user initiates a sharing action, the server cluster 110 may use credentials provided by the user to post audio streams to external sites which, may be, for example, social networking sites. Social media is defined as media, which may be but is not limited to internet-based media, useful for interaction between users and which allows the creation and interchange of information relative to a user with other users of the social media system.

Clients 160 may use any device capable of providing network communication to connect to the system. For example, mobile clients 161 may use mobile communications devices, web clients 162 may use computers equipped with web browser software, desktop clients 163 may use computers with specialized networking software, and/or other clients may use other devices. Clients 160 may connect through a network (such as the Internet or an intranet in the case of a closed or hybrid network) to the server cluster 110 to authenticate, transmit, receive messages, and/or perform other functions. The server cluster 110 may also communicate with social media systems 170 to provide features such as posting audio streams to external sites.

FIGS. 2-7 illustrate sample client 160 interface views for embodiments of the invention. In these figures, a user interacts with the system 100 through a mobile communications device. Therefore, FIGS. 2-7 display a mobile client 161. This is for example only, and embodiments of the invention may provide user interaction through any computer device operable to be connected to a network. It should also be noted that the various functions and features described with respect to each interface below may be alternatively provided in different interfaces.

Figure 2:
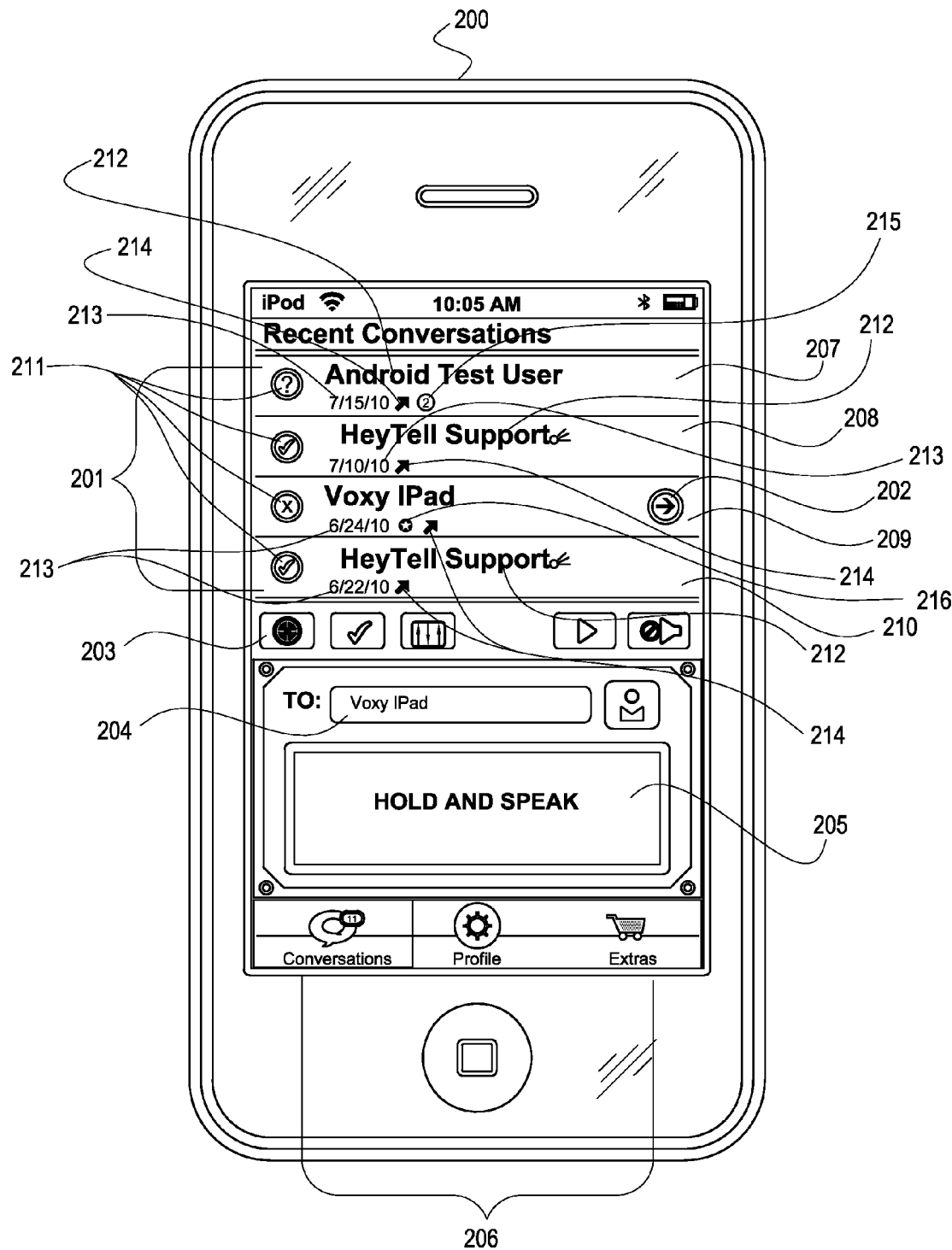
FIG. 2 depicts a client conversation interface according to an embodiment of the invention.

FIG. 2 shows an example client conversation interface 200 according to an embodiment of the invention. A list of conversations 201 may be provided. Conversations may be large enough to be easily selectable by a user's finger. Individual conversation entries (for example entries 207-210) may display at least some or all of the following information:

Relationship indicator 211: In some embodiments, a relationship indicator may display at least three states: friend (for example: green containing an arrow), blocked user (for example: red circle containing an X), untrusted user (for example: gray circle containing a question mark). States may be added or omitted in other embodiments, and different indicators for states may be used in other embodiments.

Contact name 212: Some embodiments may display the name of the other individual or group party privy to the conversation.

Time stamp 213: In some embodiments, a time stamp may display a time associated with the message. In an example embodiment, if the conversation occurs on the current day, the current time in HH:MM format may be displayed. If the conversation occurred on a previous day, the date in MM/DD/YY format may be displayed. The timestamp may be localized based on a device time zone for the sending and/or receiving device. This time may be a time when the client sent the message, a time when the system received the message, or a time when the client received the message. For example, timestamps associated with incoming messages may indicate the time at which the server received the message, and timestamps associated with outgoing messages may indicate the time at which the client sent the message.

Directional indicator 214: An indicator may display information about which user sent the most recent message. In this example embodiment, an arrow facing upwards and to the right may indicate that the user was the last person to send a message.

Number of unread messages 215: The interface may display the number of messages in the conversation that have not yet been heard and/or played all the way through.

Location indicator 216: The interface may display an indicator (for example, a star or target icon) that indicates the other party has transmitted their location along with their voice message.

Conversation expansion icon 202: The interface may provide the ability to display expanded data about conversations in the list. In some embodiments, such as the one shown in FIG. 2, conversation data may be accessed by selecting an arrow or other icon. In other embodiments, a touch gesture such as the "long press" may activate conversation expansion. When the conversation is expanded, a list of messages may be presented. Messages may be able to be played individually, deleted, exported to external media (for example to email, SMS or a social network), and/or manipulated in other ways.

In alternate embodiments, the ability to delete the conversation may be exposed by pushing a physical button, holding a long press on a touch screen, a swipe gesture, a virtual button, voice command, or any other human interface known in the mobile client art.

The conversation interface 200 may also provide a button toolbar 203. The button toolbar may contain a button for flipping to a map view, a button for changing contact relationship status, a button for enabling an optional voice changer, a play button, a button for toggling between speakerphone and earpiece modes for playback, and/or other buttons. While virtual buttons may be used in the button toolbar, the functions of the toolbar may also be activated by physical button, a swipe gesture, voice command, or any other human interface known in the mobile client art.

The conversation interface 200 may also provide a field 204 that displays the recipient name. In some embodiments, users can tap this field to select or search for a recipient or group of recipients from an address book, friends list, accessible social network, or from some other source. Users may be able to enter recipient names or select them through search results. In some embodiments, a button next to the recipient name field 204 may also provide access to these select and search features.

A hold and speak button 205 may also be provided. For embodiments wherein a mobile client 161 is used, the hold and speak button 205 may be large enough to be easily selected by a user's finger or thumb while holding the mobile device with one hand. The hold and speak button may be a virtual button as depicted in FIG. 2, or in alternate embodiments may be a physical button.

Options 206 may also be provided in some embodiments. These options 206 may allow a user to navigate to other functional areas of the application, for example a user profile page and extras page in this embodiment. In some embodiments, these functions may be obscured and displayed by use of physical buttons available on the physical hardware. In alternate embodiments these functions may be displayed by a virtual button, voice command or any other user interface known in the mobile client art.

In some embodiments of the invention, a user may start the client 160, select a recipient or group of recipients using the conversation interface 200, and press and hold the hold and speak button 205. Sound, such as the user's voice, inputted into the device while the hold and speak button 205 is activated may be transmitted by the client 160 to the server cluster 110. The server cluster 110 may notify the recipient or group of recipients. When the recipient user launches the client 160 on their own device, the client 160 may begin to download and play the message. The system of the invention allows a client to download messages simultaneously with the uploading of messages to the server from that same client. In some embodiments, message recordings may be time-limited to a particular maximum message length and may be stored on both the sender and recipient clients 160 to be replayed at a later time, exported to other media types or social networks, deleted, and/or manipulated in some other way. The maximum message length may be set by a system administrator. In embodiments with a maximum message length, the client 160 may warn users with an auditory, visual, tactile, or other alarm that the maximum message length is about to be, or has been, exceeded.

The system may also comprise a lockout period during which a user may be prevented from sending messages intended for another user to the server cluster. A user may be allowed to send new messages after the lockout time limit has expired (or may send many smaller messages that each do not exceed the time limit). The lockout period is a variable that may a hard coded value in the server computer program or may alternatively may by predetermined by the system administrator and entered into the server computer program through the use of a system interface. As a user records and transmits additional messages, if the recipient has not yet begun downloading the voice message to their client, the system may append each subsequent message to a current message of record, creating a single appended message. The system may limit the user to a total appended message length before blocking the user from sending to recipient temporarily. This temporary restriction may be lifted when the recipient client 160 begins downloading the messages and/or after the lockout period passes, at which point the system creates a new message instead of appending to the current message of record. The system may limit the user to a configurable total number of messages sent to a recipient before blocking the user from sending to recipient temporarily. This temporary restriction may be lifted when the recipient client 160 begins downloading the messages. The client 160 can be configured to send additional information, such as location information, which may, for example, be Global Positioning System information retrieved by the client from a cellular phone, along with the voice message to share with message recipients.

Figure 3:
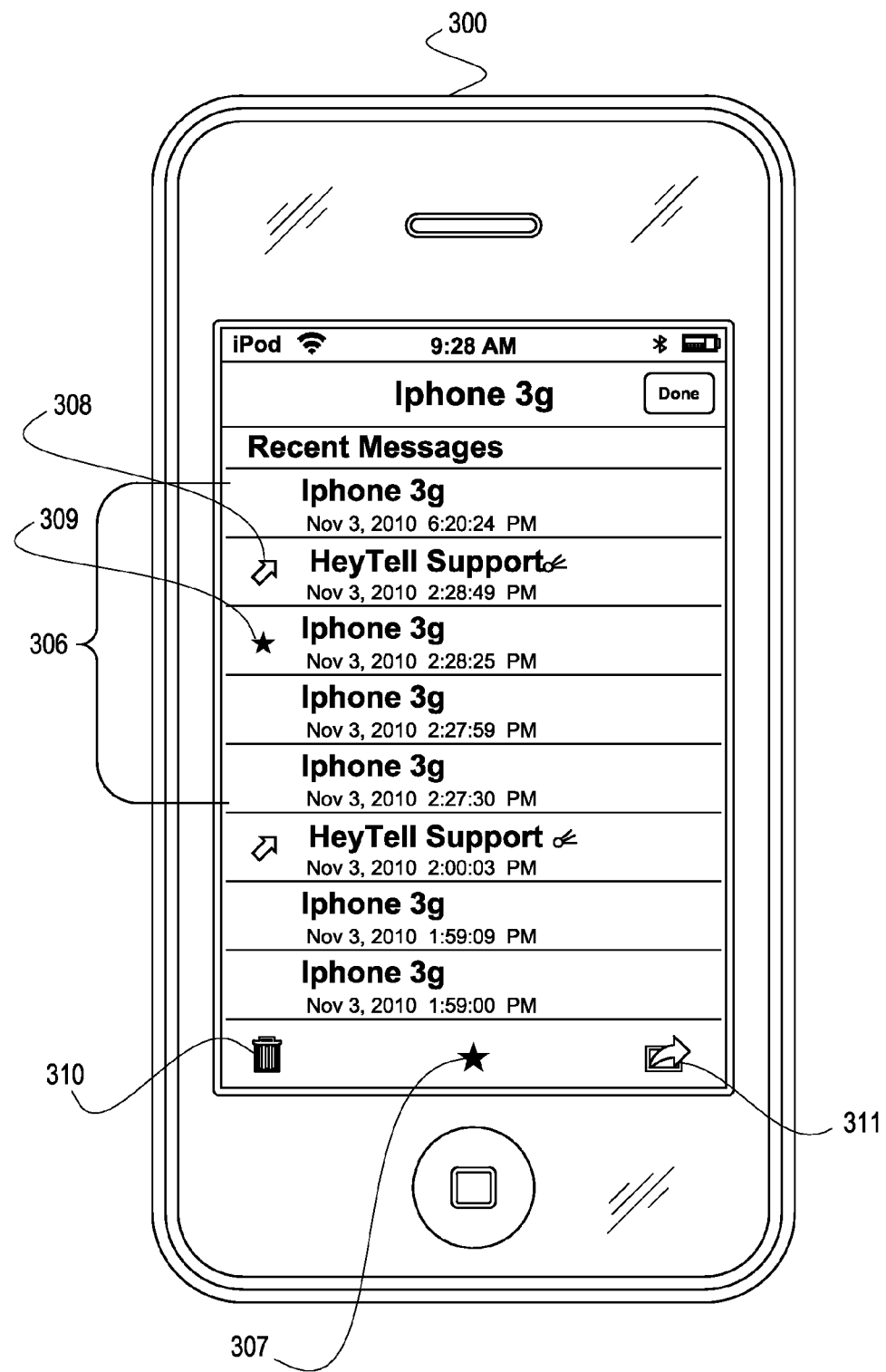
FIG. 3 depicts a conversation details interface according to an embodiment of the invention.

FIG. 3 shows a conversation details interface 300 according to an embodiment of the invention. Outgoing and incoming voice messages may be added to a list view 306. List items may contain the sender's name, date, time of message transmission, and/or other information. An icon 308 may indicate that the user sent the last message in the conversation. In this example, an arrow is used, but other symbols or indications are possible. Another icon 309 may indicate that the user has selected this message as a favorite message. In this example, a star is used, but other symbols or indications are possible. In some embodiments, the user may label a message as a favorite by selecting the message and tapping an icon 307. Users may be able to play or replay each voice message item by tapping the list item. While a message plays, an icon, for example an animated speaker icon, may appear next to the message. Users may be able to delete voice messages, add messages as favorites, export messages to email or other configured external publishing mechanisms, and/or perform other actions. In some embodiments, buttons may be provided for some or all of these actions. For example, in this embodiment, a delete button 310 and an export button 311 are provided. In some embodiments, the message can be held down until a list of actions appears as an alternative or in addition to actions provided by buttons. Actions in the list may include deleting, exporting to email or other formats, publishing to configured external publishing mechanisms, and/or other functions. Some embodiments may allow users to delete individual messages, entire conversations, delete in bulk, and/or automatically expire messages based on message age.

Figure 4:
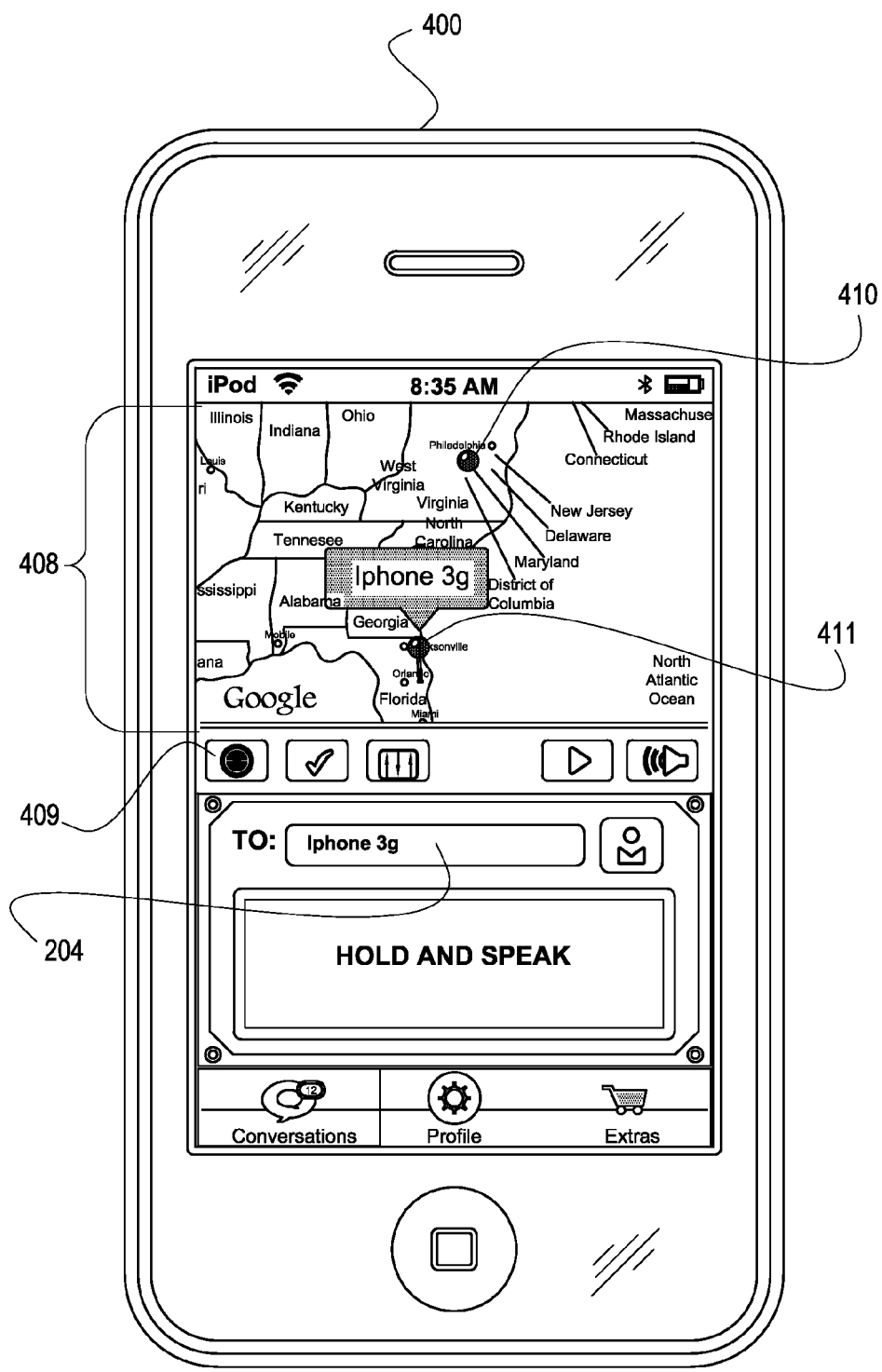
FIG. 4 depicts a client maps interface according to an embodiment of the invention.

FIG. 4 shows a client maps page 400 according to an embodiment of the invention. A maps page 400 may be provided for embodiments of the invention wherein client devices are capable of determining their locations through GPS or other geolocation technologies. In one embodiment of the invention, client users may activate the maps page 400 by tapping a map button 409. It is understood that there may be implemented other means for activating the map as are known in the art of mobile devices, such as swiping a touch screen, using audio commands, and the like. A map 408 may identify the client user's location 410 on the map. If a conversation partner has shared their location, the partner's location 411 and name and/or other information may appear on the map 408. The map 408 may resize to display both the user's location 410 and the conversation partner's location 411 in the same view. When a client user transmits a voice message from this page, the client's location may be sent to the conversation partner displayed, by way of example and not by way of limitation, in the To: field 204 shown in FIG. 4. Location may be sent along with each message and may be updated when the client user sends another message with location. In some embodiments of the invention, location information is not sent unless the maps page 400 is activated.

Figure 5:
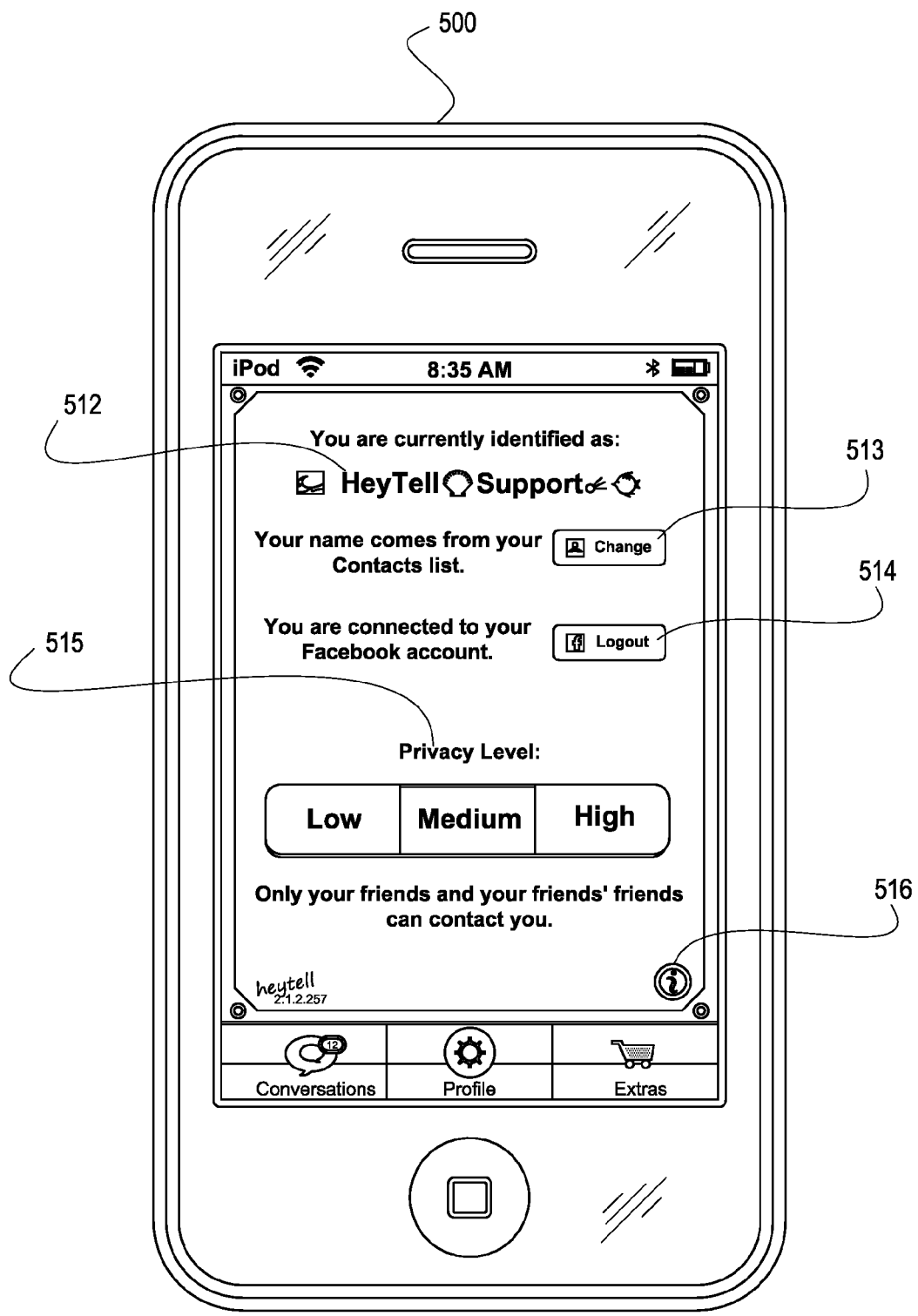
FIG. 5 depicts a client profile interface according to an embodiment of the invention.

FIG. 5 is a view of a client profile page 500 according to an embodiment of the invention. The profile page 500 may display the user's selected name 512. A user may be able to select or change the name used to identify themselves to the system and potential contacts by selecting a name change button 513 and entering information. In some embodiments, social networks can also be configured here by selecting a social network button 514 and entering information.

The profile page 500 may contain user controls to configure privacy levels 515. In the example embodiment depicted in FIG. 5 three privacy levels are displayed. These levels are Low privacy, Medium privacy, and High privacy in this exemplary embodiment. Low privacy may allow anyone who knows the user's contact information (for example, an email address, a phone number, or values included in contact information that match values the recipient has set for him or herself) to identify the user in the system (i.e., through a search) and/or voice message the user directly without explicitly inviting the user via email, SMS, or another out-of-band mechanism. Medium privacy may allow anyone who is a mutual friend with an established contact (i.e., someone who has already used the system to exchange voice messages with a mutual contact) to locate the user in the system and/or voice message the user directly without explicitly inviting the user, or allow users who have matching contact information for each other in their address books to contact one another without an invitation. High privacy may allow no one to directly voice message the user (or determine that the user is a member of the social network) without first explicitly inviting them via email, SMS, or other external publishing mechanism. These other external publishing mechanisms are known as "out of band" notification systems because they do not rely upon the communication system of the invention for invitation. In some embodiments, a user may be able to block and/or unblock a contact, and the contact may be barred from sending messages to the user who blocked them while they remain blocked. In some embodiments, voice message recipients may be unable to export messages that they themselves did not record. In some embodiments, a message sender may be able to choose to make the messages they send "public," allowing recipients to save or export these messages.

The profile page 500 may also include a link 516 that provides access to online help, licensing, terms of service, privacy policy, and/or other information. The profile page 500 may provide other user settings as appropriate to the platform or added features; for example, some versions may include the ability to set notification sounds or background services to alert users of incoming messages.

Figure 6:
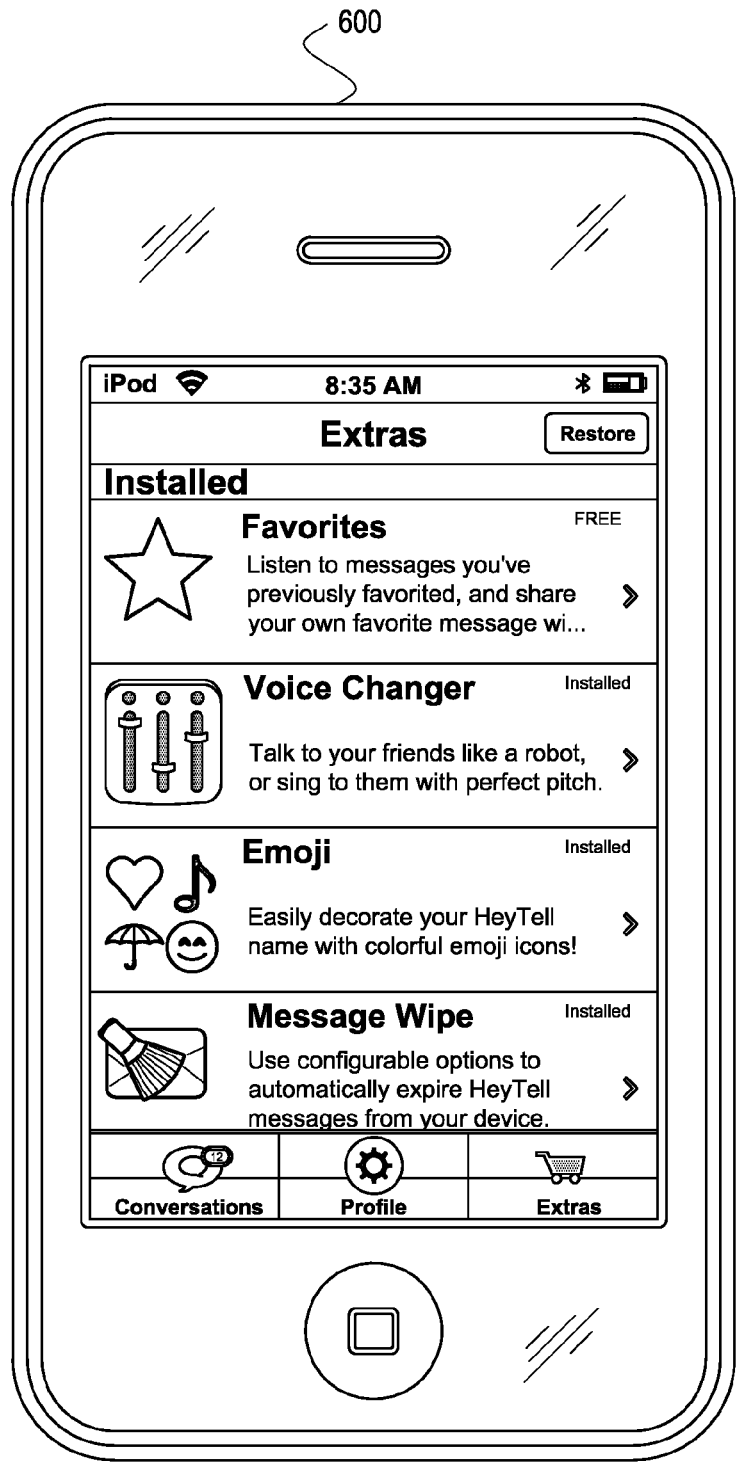
FIG. 6 depicts an extra features interface according to an embodiment of the invention.

FIG. 6 displays an extra features interface 600 according to an embodiment of the invention. Optional features may be included in the client. These features may be added, removed, changed, and/or accessed with this interface.

Figure 7:
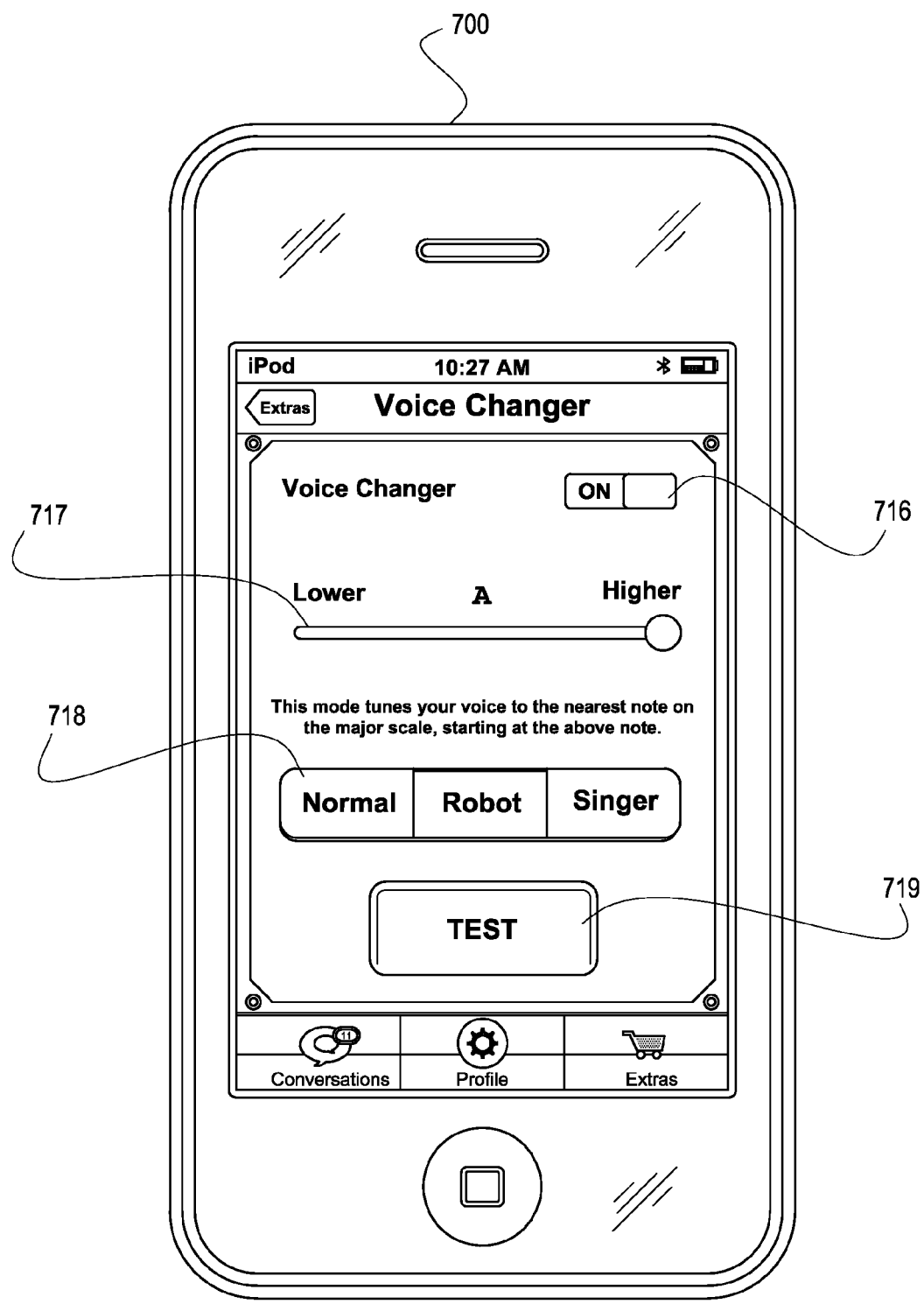
FIG. 7 depicts a voice changer interface according to an embodiment of the invention.

FIG. 7 displays a voice changer interface 700 according to an embodiment of the present invention. The voice changer interface 700 may allow a user to control the client software to modify an encoded audio stream to achieve different voice effects. The audio may be modified as it is being recorded and/or after it has been recorded. The modified audio file may be saved on the client 160 device and/or transmitted to the server cluster 110 for storage and/or eventual delivery to a recipient. The voice changer interface 700 may include an on/off switch 716, a slider 717 which may control voice pitch (in this example, across two major keys, from a Low A to Mid A to High A), configurable options 718 to change the type of voice encoding; each of which may have a different algorithm, a test button 719 enabling a preview of voice modulation so that users can determine their preferred voice modulation options, and/or other controls.

Figure 8:
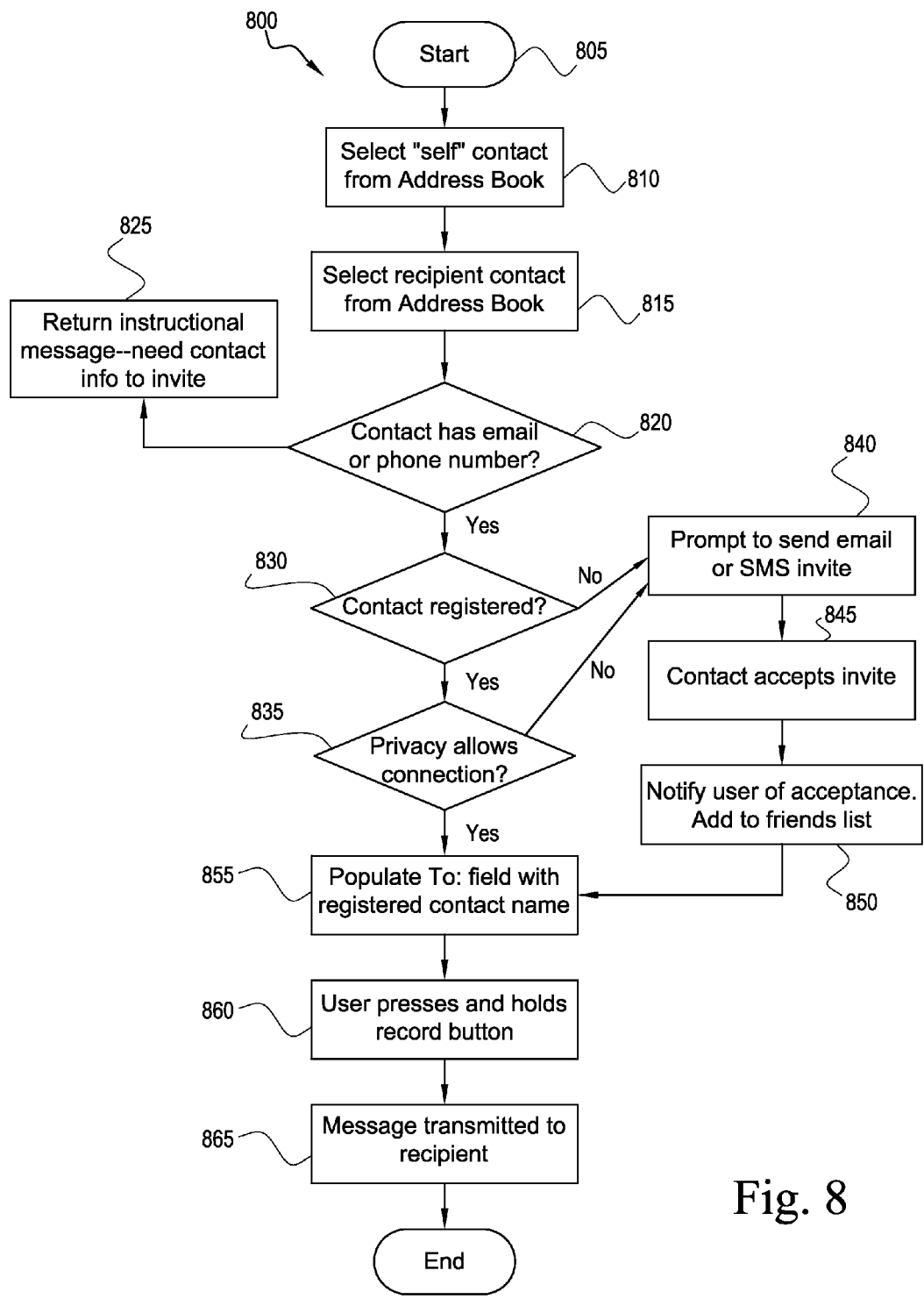
FIG. 8 depicts a user flow diagram according to an embodiment of the invention.

FIG. 8 is an architectural diagram of the user workflow 800 according to an embodiment of the present invention. A user may start 805 the client software or device. On first launch, the client may prompt the user to select a contact from their address book to identify themselves 810. Information from within this address book entry may identify the user to the system and may be used when other users of the system attempt to contact this user.

When the user selects a recipient from the address book 815, the system may check to see if an email address, phone number, or other contact information (other than contact name alone) exists within the intended recipient's contact entry 820. If no contact information exists, the client may display a message that indicates that contact information is required to resolve the recipient 825. If contact information exists, the client may dispatch a message to the server to attempt to resolve the contact information to a valid recipient 830.

If the intended recipient's contact entry does not match a system user, or if it does match a system user but the recipient's privacy level does not allow the recipient to be contacted, the client may prompt the user to invite the recipient as a contact using SMS, email, or another available out-of-band invitation mechanism 840. "Out-of-band" means, for purposes of this patent application, any communication means that utilizes a communication channel other than the network of the system. For instance, out-of-band communication includes but is not limited to SMS communication, email communication, instant messaging, push notifications, communication via messaging systems provided by social network systems, and the like. If the recipient accepts the invitation 845, the server may send a notification to the sender 850, and when the sender launches their client, the client may create a blank conversation that contains the recipient's name so that the user can quickly and easily transmit a voice message to the recipient 855. The client may also set the user and recipient relationship as "friend," which may include displaying a notification in the user interface and adding the recipient to the friends list 850.

If the intended recipient does match a system user and the recipient's privacy level allows them to be contacted 835, the recipient name may appear in the To: field 855 and the user can then record a message 860. If the contact entry for the intended recipient matches multiple system users, the client may present a list of contacts. In some embodiments, most recently active users may appear at the top of the list and an option to invite the intended recipient may appear at the bottom. Other embodiments may use other list logical rules, for example, users with the highest trust level may appear at the top of the list and the lowest may appear at the bottom. The user may then select a potential recipient from the list or may select an option to send an invitation. After the client populates the To: field with a name 855, the user may press the hold and speak button and speak 860 as the client dispatches the message to the server, which relays an alert to the intended recipient or recipients 865. When the recipient next launches their client, their client may download and play incoming voice messages.

The server may optionally send a validation email, text message, or other out-of-band mechanism as appropriate to validate that the contact information is actually owned by the user who selected the contact information (for example, the user may need to click a link within an email to verify that they own the email, or respond to an SMS sent to their phone number from their phone). The system may then give a validated user priority when other users attempt to contact them. For example, a user's name may display at the top of a list if multiple users match the same contact information. After selecting a "self" contact, the client may display the conversations page, where the user may be prompted to select a contact with which to speak.

Figure 9:
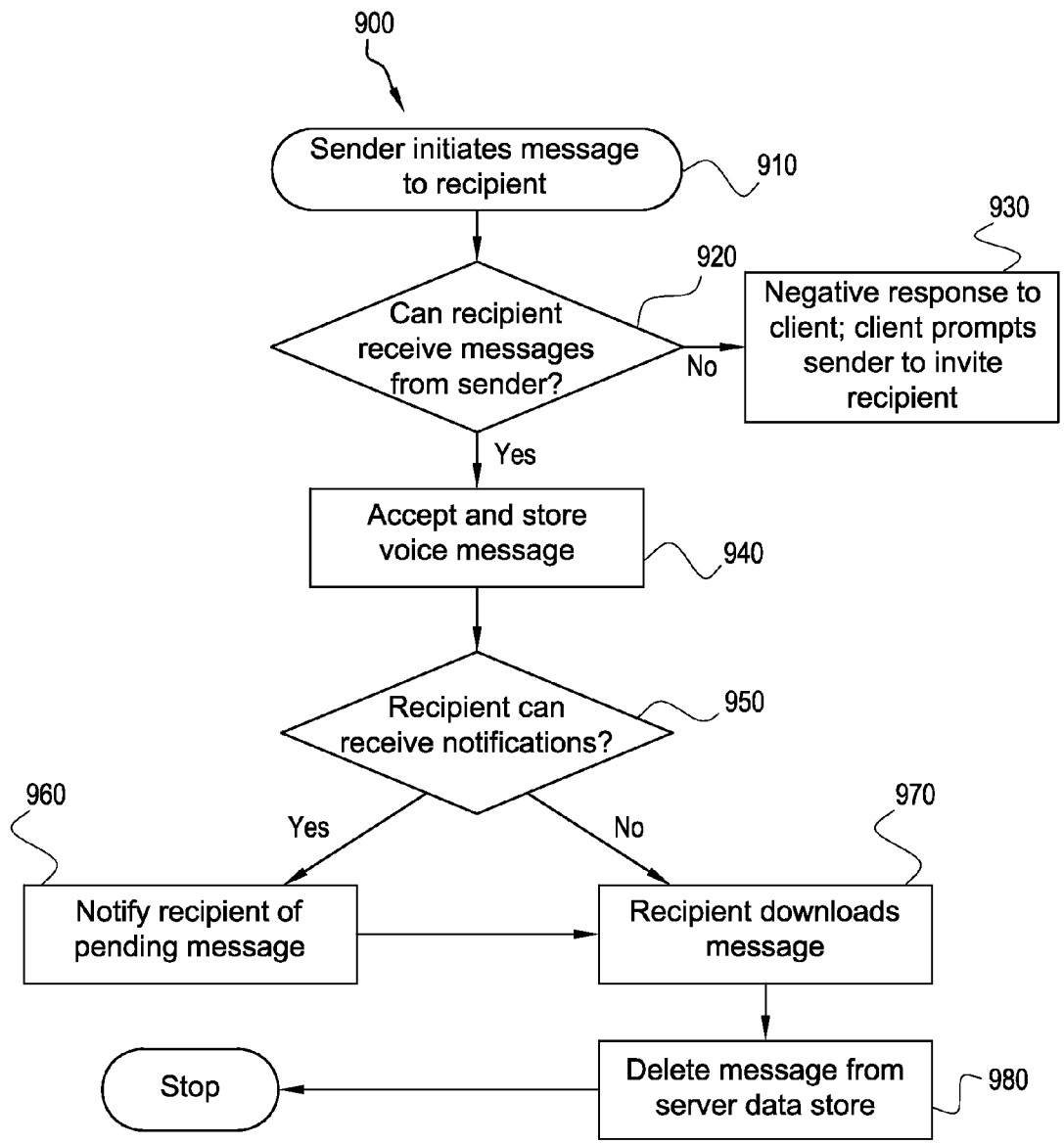
FIG. 9 depicts a system flow diagram during transmission of an audio message according to an embodiment of the invention.

FIG. 9 depicts a system flow 900 during transmission of an audio message according to an embodiment of the invention. The server may receive a sender-initiated message intended for a recipient, which may be submitted audio and/or data (such as location data) or a request to resolve the recipient 910. The server may deduce whether the sender has a high enough trust level to send messages to the receiver, and/or if the recipient has a privacy level low enough to receive them 920.

If the receiver cannot receive the message, the server may send a negative response to the sender client 930. The client may display a message to the sender indicating that the recipient is not registered or their privacy settings preclude them from receiving messages.

If the sender's trust level matches or exceeds the recipient's privacy level, when audio or other data is received, the server may accept and store the message 940. The server may check to see if the recipient can receive notifications 950. If the recipient user has configured notifications on their client, the server may dispatch a notification subject to preferences and/or notification system type designated by the client 960. The recipient then, or at some point in the future, may download the message 970. After the client is finished downloading, the server may receive notification from the client indicating that the message has been successfully downloaded, and the server may delete the message from its data store 980. In an alternative embodiment, the server may store the message in data store for a configurable amount of time, for example two minutes, after which time the server may store the message onto disk, cloud storage, or other media where it can be retrieved at a later time. After a receiving user has downloaded the message it may be deleted by the system, or it may be stored by the server depending upon the desire of the user of the system. Group messages with multiple recipients may not be deleted until all recipients have downloaded the message and/or until the administrator-configurable maximum message lifetime of 30 days has passed.

Figure 10:
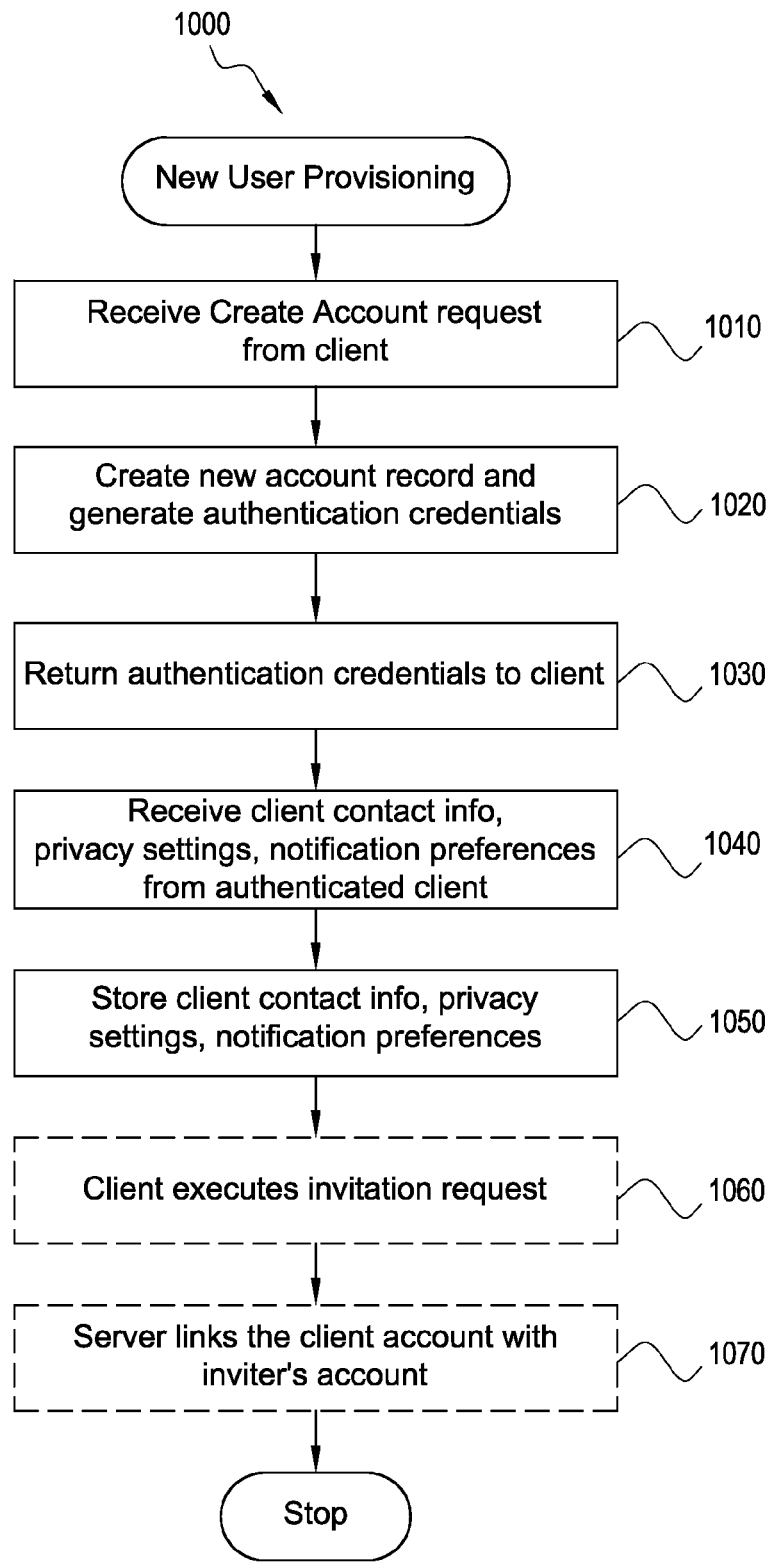
FIG. 10 depicts server steps for provisioning a new user according to an embodiment of the invention.

FIG. 10 depicts server steps for provisioning a new user 1000 according to an embodiment of the invention. The server may receive a create account request from a client 1010. After determining that the request is valid, the server may create a new account record in its database and generate authentication credentials 1020. It may then pass these authentication credentials back to the client for future use when communicating with the server 1030. The client may then authenticate using the credentials it was provided and send contact information (user name, email address, phone number, for example), privacy settings, the user's notification preferences (external or internal notification type, tokens or other authentication credentials required for external notifications, etc.), and/or other information. The server may receive this information from the client 1040. The server may store this information with the user record 1050. Optionally, the client may execute an invitation link that the user previously received from another system user, and the server may receive notification that the client has connected using this link 1060. The server may link the new user with the existing system user who provided the invitation as friends 1070.

Figure 11:
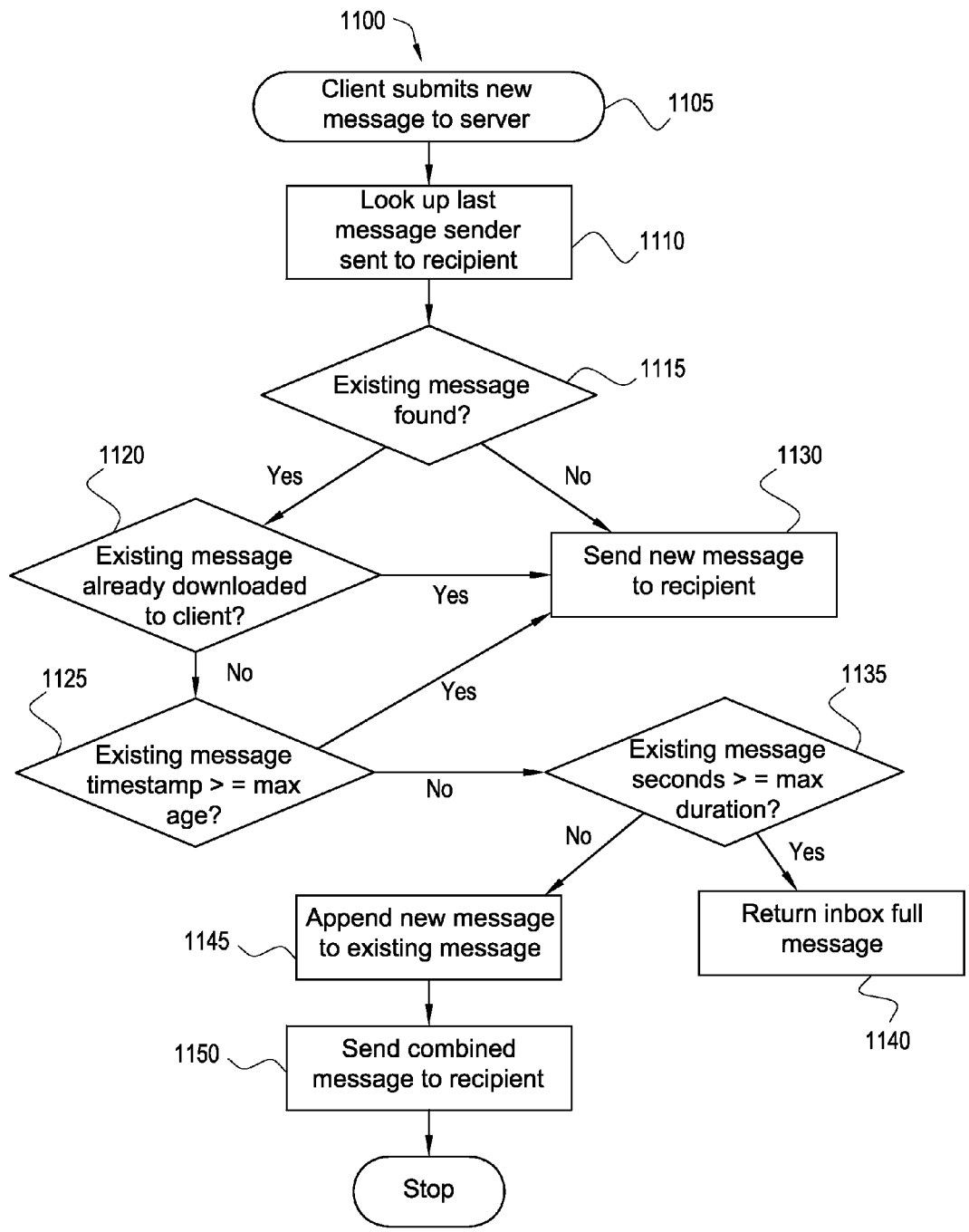
FIG. 11 depicts a system flow diagram for handling multiple messages according to an embodiment of the invention.

FIG. 11 depicts a system flow 1100 describing how the server may determine whether to append incoming messages to existing messages or to generate new messages. The server may receive a client-submitted message to a recipient 1105. (Note that this flow chart assumes that the recipient trusts the sender. See FIGS. 9, 12, and 13 for detail on determining trust, which may occur before the server begins its message append determination logic). When the server receives the new audio data and/or associated metadata (hereinafter in this figure description referred to as 'voice message'), it may first perform a lookup to determine if an existing voice message exists 1115. If an existing voice message is not found, the server may create a new voice message 1130. If an existing voice message is found, the server may check to see if the recipient has begun downloading the existing message 1120. If the recipient has already downloaded or is in the process of downloading the existing message, the server may create a new voice message 1130. If the recipient has not yet downloaded the existing message, the server may check to see if the existing message is older than the maximum time allowed to append as configured by a system administrator or set by default 1125. If so, the server may create a new message 1130. For example, if the existing voice message is 1 day old and the maximum time allowed to append is 1 hour, the server may generate a new voice message instead of appending. If the message is not older than the maximum time allowed to append (for example, if the existing message is 30 seconds old), the server may then check to see if the existing message is longer than the maximum allowable time, or maximum duration, to record as configured by the system administrator or set by default 1135. If the existing message is more than the maximum allowable time to record (for example, if the existing message is 90 seconds long and the maximum allowable time to record is 30 seconds), the server may reject the message and transmit a response to the sender client that may launch an "inbox full" message 1140. If the existing message is not longer than the maximum allowable time to record, the server may append the new voice message to the old voice messages, and may modify the metadata to display the most recently updated message receipt timestamp 1145. When the server next transmits messages to the recipient client in response to a recipient client request to download their messages, the server may send a single message comprised of the existing voice message plus the new voice message 1150. In alternative embodiment of the system of the invention, the server may limit the number of messages sent from a sending client terminal to a receiving client terminal. In a still further alternate embodiment, the server may limit both the message duration and the number of messages sent from a sending client terminal to a receiving client terminal.

Figure 12:
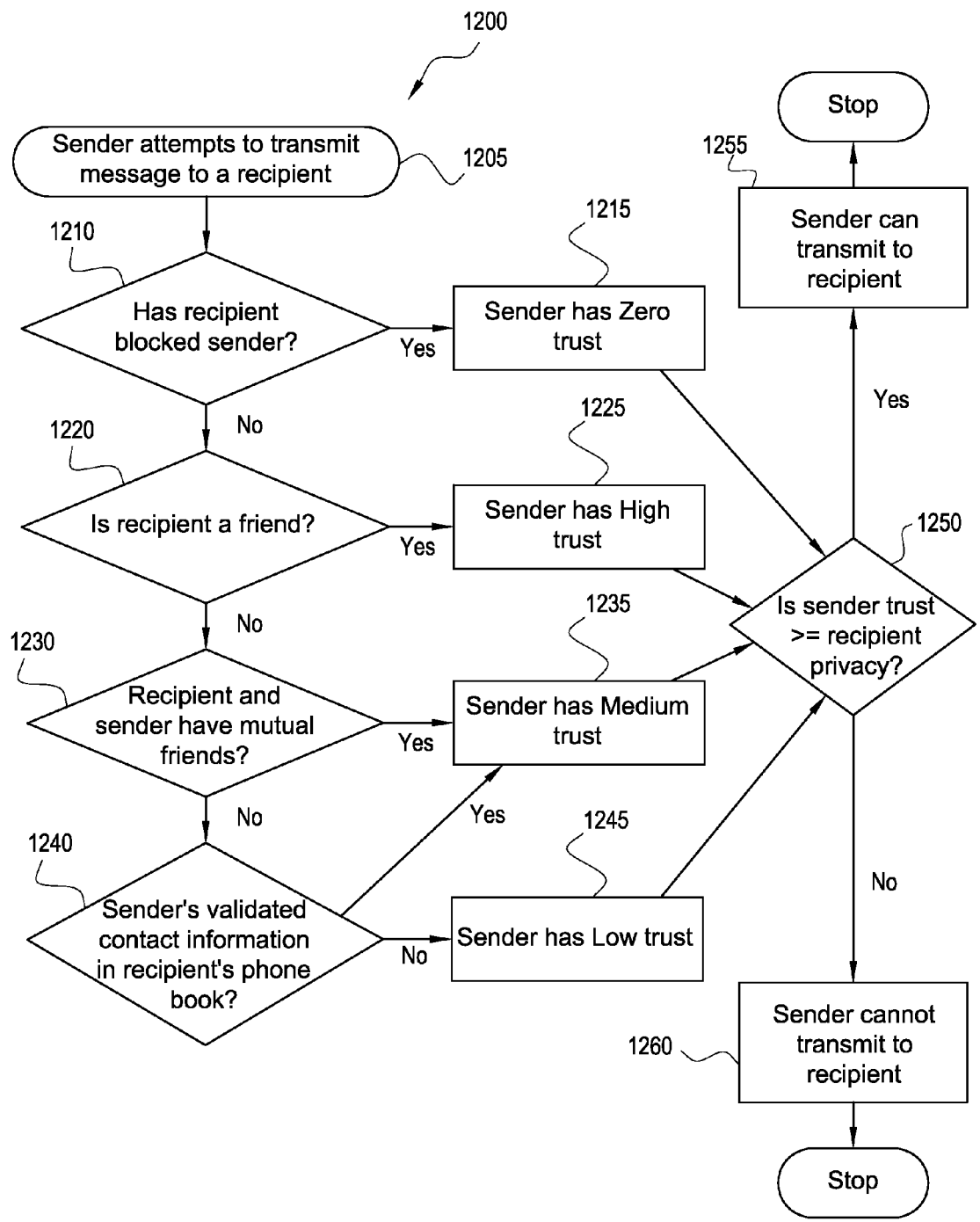
FIG. 12 depicts a system flow diagram for determining trust between a sender and a recipient according to an embodiment of the invention.

FIG. 12 depicts a system flow 1200 diagram for determining trust between a sender and a recipient according to an embodiment of the invention. The server may allow senders to contact recipients if the computed trust level of the sender is greater than or equal to the privacy level set by the recipient. In the embodiment of FIG. 12, users can select from three privacy levels: low, medium, or high. Other embodiments may have more or fewer levels. The server may assign a trust level between a single sender and a recipient that may be described as zero, low, medium, and/or high. In this embodiment, the default trust between any two users is low, though other defaults are possible within the scope of the invention.

When a server receives a sender's attempt to send a message to a recipient 1205, the server may verify that the recipient has not blocked the sender 1210. If the recipient has blocked the sender, the sender may be assigned a zero trust level with the recipient 1215. The system may then check to see if sender trust is greater than or equal to recipient privacy 1250. A zero sender trust will always be less than a recipient privacy, therefore in this case the sender may be prevented from discovering (where "discover" indicates that the potential recipient name is returned in a list of possibly matching contacts), nor may they contact the recipient 1260.

If the sender and recipient are already connected as friends within the system or if the server detects that the recipient has already designated the sender as a friend 1220, the sender may be assigned high trust with the recipient 1225. High trust will always be at least equal to recipient privacy 1250. The sender may be permitted to discover and contact the recipient 1255.

If the server detects that the sender and recipient have mutual friends 1230, the sender may be assigned medium trust with the recipient 1235. In the case of medium trust, where the recipient has medium or low privacy, the comparison 1250 may determine that the sender can discover and contact the recipient 1255. If the recipient has high privacy, the comparison 1250 may determine that the sender cannot discover or contact the recipient and the system may notify the sender that they must use an invitation to connect 1260.

If the server determines that the sender's contact information appears in the recipient's address book 1240, the sender may be assigned medium trust with the recipient 1235. In the case of medium trust, where the recipient has medium or low privacy, the comparison 1250 may determine that the sender can discover and contact the recipient 1255. If the recipient has high privacy, the comparison 1250 may determine that the sender cannot discover or contact the recipient and the system may notify the sender that they must use an invitation to connect 1260.

In other cases, the sender may be assigned low trust with the recipient 1245. If the sender has low trust, the comparison 1250 may determine that the sender can contact any recipient that has low privacy 1255. If the recipient has medium or high privacy, the comparison 1250 may determine that the sender cannot discover or contact the recipient and the system may notify the sender that they must use an invitation to connect 1260.

Figure 13:
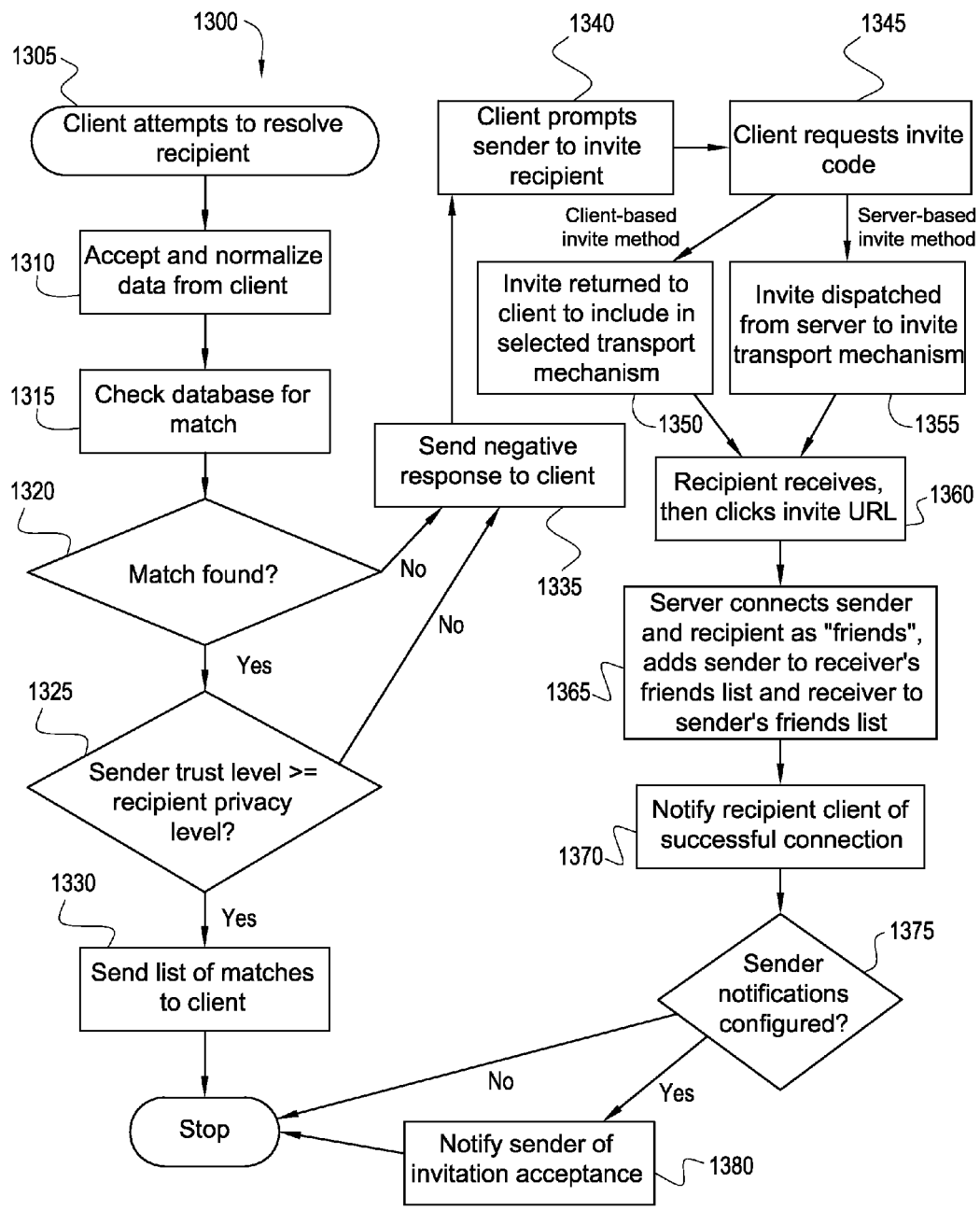
FIG. 13 depicts a system flow diagram for handling user resolution and invitation according to an embodiment of the invention.

FIG. 13 depicts a system flow 1300 diagram for handling user resolution and invitation according to an embodiment of the invention. A sender client may send a request to resolve a recipient comprised of contact information associated with the recipient, which the server may receive 1305. The server may accept the recipient contact information and normalize the data 1310. The server may compare the data against a database of known user contact information 1315. If a match is not found 1320, the server may send a negative response to the client 1335. If a match is found 1320, the server may check to see whether the sender trust level is greater than or equal to the recipient privacy level 1325 (see FIG. 12 for an explanation of an embodiment of this determination). The server may send a list of matches to the client 1330. In some embodiments, the matches may have a privacy level greater than or equal to the user's trust level to the client. A client may display the list to the sender so that the sender can select a recipient. The server may also prepare and send an invitation link code along with the list of users so that the sender can optionally choose none of the matches and instead send an invitation to a contact (which may have a higher privacy level than can be contacted or may not yet be a system user). If the user chooses a name from the list, they may begin sending messages according to embodiments of the invention described above.

When a negative response is sent to the client 1335, the server's response may cause the client to prompt the sender to invite the recipient 1340, in the event that a potential recipient may have a higher privacy level than can be contacted or may not yet be a system user. The sender may initiate an invite request from the client, and the server may receive the invite request 1345. In some embodiments, multiple invite types may be available. Depending on the type of invite specified by the client's request, the server may pass back an invite code to the client for inclusion in a client-based invitation 1350 (for example, SMS, email, or post to social network) or may dispatch the invite code directly from the server 1355 (for example, if the client hardware is not capable of sending SMS or email invitations itself). This code may be contained in a unique URL, which the server may transmit to the client 1360. When a recipient clicks the invite URL, the client and invitation code may be activated, or instructions on how to activate the invitation code may be displayed to the user.

When a potential recipient activates the invitation code, they may be redirected to the client. The client application may transmit the code and the recipient's user ID to the server, which may receive this information. The server may link the sender's user ID and recipient's user ID as friends within the system 1365. The server then may transmit a success code and the sender's name and user ID back to the client 1370. The client may use this information, for example by adding the sender's name to a list of friends and/or marking it with a "friend" icon. The client may also create a blank conversation or sample message so that the recipient can send voice messages to the sender. The server may check to see if the sender has notifications enabled 1375. If the sender has notifications enabled, the server may dispatch a notification to the sender's device 1380, which may notify them that their friend has accepted the invitation and may add the recipient to the sender's list of friends.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures, which highlight the functionality and advantages, are presented for example purposes only. The disclosed methodology and system are each sufficiently flexible and configurable, such that they may be utilized in ways other than that shown.

It should also be noted that the terms "a", "an", "the", "said", etc. signify "at least one" or "the at least one" in the specification, claims and drawings.

What is claimed is:

1. A system for voice messaging, comprising:
   a server cluster connected to a communications network, wherein said server cluster is capable of transmitting, receiving, and storing of audio messages, and wherein said server cluster is further capable of transmitting and receiving location information;
   a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;
   a sending client terminal computer program stored in a non-transitory computer readable medium on said sending client terminal, said sending client terminal program comprising instructions for recording said first audio message from a sending user and transmitting said audio first message to said server cluster;
   a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message;
   wherein;
   said sending client terminal computer program contains instructions for receiving sending client terminal location information and transmitting said sending client terminal location information to said server cluster;
   said server computer program contains instructions for receiving and storing said sending client terminal location information and transmitting said sending client terminal location information to said at least one receiving client terminal;
   said at least one receiving client terminal computer program contains instructions for receiving and displaying said sending client terminal location information on a visual display; and wherein:

said sending client terminal further comprises a display;

said sending client terminal program further comprises instructions for displaying a map upon said sending client terminal display; and said sending client terminal program further comprises instructions for transmitting said sending client terminal location information if said sending user transmits a message while said map is displayed on said sending client terminal display.

2. A system for voice messaging, comprising:

a server cluster connected to a communications network, wherein said server cluster is capable of transmitting, receiving, and storing of audio messages, and wherein said server cluster is further capable of transmitting and receiving location information;

a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;

a sending client terminal computer program stored in a non-transitory computer readable medium on said sending client terminal, said sending client terminal program comprising instructions for recording said first audio message from a sending user and transmitting said audio first message to said server cluster;

a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message;

wherein said server computer program is further comprised of instructions for:

receiving and storing a plurality of audio messages received from said sending client terminal;

appending each message of said plurality of audio messages to the message immediately preceding it in time as received by said server computer program to create an appended audio message;

determining the duration of said appended audio message after each message is appended;

comparing said duration of said appended audio message to a predetermined maximum appended audio message duration;

continuing to append said audio messages until said duration of said appended audio message exceeds said predetermined maximum appended audio message duration; and blocking transmission of additional audio messages from said sending client terminal for a predetermined lockout period or until at least one receiving client has begun downloading said appended audio message if said appended audio message exceeds said predetermined maximum message duration.

3. The system of claim 2, wherein said sending client terminal computer program is further comprised of instructions for performing a voice changing operation on said first audio message prior to transmission to said server cluster.

4. The system of claim 2, wherein said sending client terminal computer program contains instructions for receiving social media credentials from said sending user and transmitting said first audio message to a social media network.

5. A system for voice messaging, comprising:

a server cluster connected to a communications network, wherein said server cluster is capable of transmitting, receiving, and storing of audio messages, and wherein said server cluster is further capable of transmitting and receiving location information;

a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;

a sending client terminal computer program stored in a non-transitory computer readable medium on said sending client terminal, said sending client terminal program comprising instructions for recording said first audio message from a sending user and transmitting said audio first message to said server cluster; and a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:

wherein said server computer program is further comprised of instructions for:

receiving and storing a plurality of audio messages received from said sending client terminal;

appending each message of said plurality of audio messages to the message immediately preceding it in time as received by said server computer program to create an appended audio message;

determining the duration of said appended audio message after each message is appended;

comparing said duration of said appended audio message to a predetermined maximum appended audio message duration;

continuing to append said audio messages until said duration of said appended audio message exceeds said predetermined maximum appended audio message duration; and blocking transmission of additional audio messages from said sending client terminal for a predetermined lockout period or until at least one receiving client has begun downloading said appended audio message if said appended audio message exceeds said predetermined maximum message duration; and wherein;

said sending client terminal computer program contains instructions for receiving sending client terminal location information and transmitting said sending client terminal location information to said server cluster; and wherein said server computer program contains instructions for receiving and storing said sending client terminal location information and transmitting said sending client terminal location information to said at least one receiving client terminal; and wherein said at least one receiving client terminal computer program contains instructions for receiving and displaying said sending client terminal location information on a visual display.

6. The system of claim 5, wherein:

said server computer program further comprises instructions for assigning a trust level to a sending client terminal, said sending client terminal trust level selected from the group consisting of a plurality of trust levels ranking from a lowest ranking to a highest ranking; and wherein said receiving client terminal computer program further comprises instructions for assigning a receiving client privacy level, said receiving client privacy level selected from the group consisting of a plurality of privacy levels ranking from a lowest ranking to a highest ranking; and wherein said server computer program further comprises instructions for comparing said sending client terminal trust level to said receiving client privacy level and allowing downloading of said audio message to said at least one receiving client terminal only if said sending client terminal trust level equals or exceeds said receiving client privacy level and if said receiving client has not blocked said sending client terminal.

7. The system of claim 6, wherein said sending client terminal program further comprises instructions for forwarding said audio message to an out-of-band communication system.

8. The system of claim 7, wherein said sending client terminal program further comprises instructions for inviting a contact to join the system of the invention by transmitting an invitation message to said contact using an out-of-band communication system.

9. The system of claim 8, wherein:

said sending client terminal further comprises a display; and wherein said sending client terminal program further comprises instructions for displaying a map upon said sending client terminal display; and wherein said sending client terminal program further comprises instructions for transmitting said sending client terminal location information if said sending user transmits a message while said map is displayed on said sending client terminal display.

10. The system of claim 9, wherein said at least one receiving client terminal comprises a plurality of receiving client terminals.

11. A system for voice messaging, comprising:

a server cluster connected to a communications network, wherein said server cluster is capable of transmitting, receiving, and storing of audio messages, and wherein said server cluster is further capable of transmitting and receiving location information;

a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;

a sending client terminal computer program stored in a non-transitory computer readable medium on said sending client terminal, said sending client terminal program comprising instructions for recording said first audio message from a sending user and transmitting said audio first message to said server cluster; and a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:

wherein said server computer program is further comprised of instructions for:

receiving and storing a plurality of audio messages received from said sending client terminal;

appending each message of said plurality of audio messages to the message immediately preceding it in time as received by said server computer program to create an appended audio message;

determining the duration of said appended audio message after each message is appended;

comparing said duration of said appended audio message to a predetermined maximum appended audio message duration;

continuing to append said audio messages until said duration of said appended audio message exceeds said predetermined maximum appended audio message duration; and blocking transmission of additional audio messages from said sending client terminal for a predetermined lockout period or until at least one receiving client has begun downloading said appended audio message if said appended audio message exceeds said predetermined maximum message duration; and wherein;

said server computer program further comprises instructions for assigning a trust level to a sending client terminal, said sending client terminal trust level selected from the group consisting of a plurality of trust levels ranking from a lowest ranking to a highest ranking; and wherein said receiving client terminal computer program further comprises instructions for assigning a receiving client privacy level, said receiving client privacy level selected from the group consisting of a plurality of privacy levels ranking from a lowest ranking to a highest ranking; and wherein said server computer program further comprises instructions for comparing said sending client terminal trust level to said receiving client privacy level and allowing downloading of said audio message to said at least one receiving client terminal only if said sending client terminal trust level equals or exceeds said receiving client privacy level and if said receiving client has not blocked said sending client terminal.

12. A system for voice messaging, comprising:

a server cluster connected to a communications network, wherein said server cluster is capable of transmitting, receiving, and storing of audio messages, and wherein said server cluster is further capable of transmitting and receiving location information;

a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;

a sending client terminal computer program stored in a non-transitory computer readable medium on said sending client terminal, said sending client terminal program comprising instructions for recording said first audio message from a sending user and transmitting said audio first message to said server cluster; and a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:

wherein said server computer program is further comprised of instructions for:

receiving and storing a plurality of audio messages received from said sending client terminal;

appending each message of said plurality of audio messages to the message immediately preceding it in time as received by said server computer program to create an appended audio message;

determining the duration of said appended audio message after each message is appended;

comparing said duration of said appended audio message to a predetermined maximum appended audio message duration;

continuing to append said audio messages until said duration of said appended audio message exceeds said predetermined maximum appended audio message duration; and blocking transmission of additional audio messages from said sending client terminal for a predetermined lockout period or until at least one receiving client has begun downloading said appended audio message if said appended audio message exceeds said predetermined maximum message duration; and wherein said sending client terminal computer program is further comprised of instructions for performing a voice changing operation on said first audio message prior to transmission to said server cluster; and wherein said sending client terminal computer program contains instructions for receiving sending client terminal location information and transmitting said sending client terminal location information to said server cluster; and wherein said server computer program contains instructions for receiving and storing said sending client terminal location information and transmitting said sending client terminal location information to said at least one receiving client terminal; and wherein said at least one receiving client terminal computer program contains instructions for receiving and displaying said sending client terminal location information on a visual display.

13. A system for voice messaging, comprising:

a server cluster connected to a communications network, wherein said server cluster is capable of transmitting, receiving, and storing of audio messages, and wherein said server cluster is further capable of transmitting and receiving location information;

a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;

a sending client terminal computer program stored in a non-transitory computer readable medium on said sending client terminal, said sending client terminal program comprising instructions for recording said first audio message from a sending user and transmitting said audio first message to said server cluster; and a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:

wherein said server computer program is further comprised of instructions for:

receiving and storing a plurality of audio messages received from said sending client terminal;

appending each message of said plurality of audio messages to the message immediately preceding it in time as received by said server computer program to create an appended audio message;

determining the duration of said appended audio message after each message is appended;

comparing said duration of said appended audio message to a predetermined maximum appended audio message duration;

continuing to append said audio messages until said duration of said appended audio message exceeds said predetermined maximum appended audio message duration; and blocking transmission of additional audio messages from said sending client terminal for a predetermined lockout period or until at least one receiving client has begun downloading said appended audio message if said appended audio message exceeds said predetermined maximum message duration; and wherein said sending client terminal computer program is further comprised of instructions for performing a voice changing operation on said first audio message prior to transmission to said server cluster; and wherein:

said server computer program further comprises instructions for assigning a trust level to a sending client terminal, said sending client terminal trust level selected from the group consisting of a plurality of trust levels ranking from a lowest ranking to a highest ranking; and wherein said receiving client terminal computer program further comprises instructions for assigning a receiving client privacy level, said receiving client privacy level selected from the group consisting of a plurality of privacy levels ranking from a lowest ranking to a highest ranking; and wherein said server computer program further comprises instructions for comparing said sending client terminal trust level to said receiving client privacy level and allowing downloading of said audio message to said at least one receiving client terminal only if said sending client terminal trust level equals or exceeds said receiving client privacy level and if said receiving client has not blocked said sending client terminal.

14. A system for voice messaging, comprising:
a server cluster connected to a communications network, wherein said server cluster is capable of transmitting, receiving, and storing of audio messages, and wherein said server cluster is further capable of transmitting and receiving location information;
a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;
a sending client terminal computer program stored in a non-transitory computer readable medium on said sending client terminal, said sending client terminal program comprising instructions for recording said first audio message from a sending user and transmitting said audio first message to said server cluster; and
a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:
wherein said server computer program is further comprised of instructions for:
receiving and storing a plurality of audio messages received from said sending client terminal;
appending each message of said plurality of audio messages to the message immediately preceding it in time as received by said server computer program to create an appended audio message;
determining the duration of said appended audio message after each message is appended;
comparing said duration of said appended audio message to a predetermined maximum appended audio message duration;
continuing to append said audio messages until said duration of said appended audio message exceeds said predetermined maximum appended audio message duration; and
blocking transmission of additional audio messages from said sending client terminal for a predetermined lockout period or until at least one receiving client has begun downloading said appended audio message if said appended audio message exceeds said predetermined maximum message duration; and
wherein said sending client terminal computer program contains instructions for receiving social media credentials from said sending user and transmitting said first audio message to a social media network; and
wherein;
said sending client terminal computer program contains instructions for receiving sending client terminal location information and transmitting said sending client terminal location information to said server cluster; and
wherein said server computer program contains instructions for receiving and storing said sending client terminal location information and transmitting said sending client terminal location information to said at least one receiving client terminal; and
wherein said receiving client terminal computer program contains instructions for receiving and displaying said sending client terminal location information on a visual display.

15. A system for voice messaging, comprising:
a server cluster connected to a communications network, wherein said server cluster is capable of transmitting, receiving, and storing of audio messages, and wherein said server cluster is further capable of transmitting and receiving location information;
a server computer program stored in a non-transitory computer readable medium on said server cluster, said server computer program comprising instructions for receiving and storing a first audio message received from a sending client terminal, and wherein said server computer program further comprises instructions for transmitting said first audio message to at least one receiving client terminal upon receipt of a transmit request from said at least one receiving client terminal;
a sending client terminal computer program stored in a non-transitory computer readable medium on said sending client terminal, said sending client terminal program comprising instructions for recording said first audio message from a sending user and transmitting said audio first message to said server cluster; and
a receiving client terminal computer program stored in a non-transitory computer readable medium on said at least one receiving client terminal, said receiving client terminal program comprising instructions for downloading said first audio message, storing said first audio message, alerting a receiving user that said first audio message is available for listening, and playing back said first audio message:
wherein said server computer program is further comprised of instructions for:
receiving and storing a plurality of audio messages received from said sending client terminal;
appending each message of said plurality of audio messages to the message immediately preceding it in time as received by said server computer program to create an appended audio message;
determining the duration of said appended audio message after each message is appended;
comparing said duration of said appended audio message to a predetermined maximum appended audio message duration;
continuing to append said audio messages until said duration of said appended audio message exceeds said predetermined maximum appended audio message duration; and
blocking transmission of additional audio messages from said sending client terminal for a predetermined lockout period or until at least one receiving client has begun downloading said appended audio message if said appended audio message exceeds said predetermined maximum message duration; and
wherein said sending client terminal computer program contains instructions for receiving social media credentials from said sending user and transmitting said first audio message to a social media network; and
wherein:
said server computer program further comprises instructions for assigning a trust level to a sending client terminal, said sending client terminal trust level selected from the group consisting of a plurality of trust levels ranking from a lowest ranking to a highest ranking; and wherein said receiving client terminal computer program further comprises instructions for assigning a receiving client privacy level, said receiving client privacy level selected from the group consisting of a plurality of privacy levels ranking from a lowest ranking to a highest ranking; and wherein said server computer program further comprises instructions for comparing said sending client terminal trust level to said receiving client privacy level and allowing downloading of said audio message to said at least one receiving client terminal only if said sending client terminal trust level equals or exceeds said receiving client privacy level and if said receiving client has not blocked said sending client terminal.

16. A method for audio messaging, comprising;
(a) providing a server cluster;
(b) providing a sending client terminal having a sending user and having the ability to record and transmit audio messages to said server cluster;
(c) providing at least one receiving client terminal having a receiving user and having the ability to download and playback audio messages from said server cluster;
(d) transmitting an audio message intended to be received by said receiving user from said sending client terminal to said server cluster;
(e) storing said audio message on said server cluster;
(f) determining whether said at least one receiving client terminal has begun downloading said audio message from said server cluster;
(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;
(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;
(i) receiving and storing sending client terminal location information;
(j) transmitting said sending client terminal location information to said server cluster;
(k) storing said sending client terminal location information on said server cluster;
(l) transmitting said sending client terminal location from said server cluster to said at least one receiving client terminal; and
(m) displaying said sending client terminal location on a visual display.

17. The method of claim 16, further comprising the step of:
(a) assigning a sending client terminal trust level selected from the group consisting of a plurality of trust levels ranking from a lowest ranking to a highest ranking;
(b) assigning a receiving client privacy level, said receiving client privacy level selected from the group consisting of a plurality of privacy levels ranking from a lowest ranking to a highest ranking; and
(c) comparing said sending client terminal trust level to said receiving client terminal privacy level and allowing downloading of said audio message to said receiving client terminal only if said sending client terminal trust level equals or exceeds said receiving client terminal privacy level and if said at least one receiving client terminal has not blocked said sending client terminal.

18. A method for audio messaging, comprising;
(a) providing a server cluster;
(b) providing a sending client terminal having a sending user and having the ability to record and transmit audio messages to said server cluster;
(c) providing at least one receiving client terminal having a receiving user and having the ability to download and playback audio messages from said server cluster;
(d) transmitting an audio message intended to be received by said receiving user from said sending client terminal to said server cluster;
(e) storing said audio message on said server cluster;
(f) determining whether said at least one receiving client terminal has begun downloading said audio message from said server cluster;
(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;
(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;
(i) assigning a sending client terminal trust level selected from the group consisting of a plurality of trust levels ranking from a lowest ranking to a highest ranking;
(j) assigning a receiving client privacy level, said receiving client privacy level selected from the group consisting of a plurality of privacy levels ranking from a lowest ranking to a highest ranking; and
(k) comparing said sending client terminal trust level to said receiving client terminal privacy level and allowing downloading of said audio message to said at least one receiving client terminal only if said sending client terminal trust level equals or exceeds said receiving client terminal privacy level and if said at least one receiving client terminal has not blocked said sending user.

19. A method for audio messaging, comprising;
(a) providing a server cluster;
(b) providing a sending client terminal having a sending user and having the ability to record and transmit audio messages to said server cluster.
(c) providing at least one receiving client terminal having a receiving user and having the ability to download and playback audio messages from said server cluster;
(d) transmitting an audio message intended to be received by said receiving user from said sending client terminal to said server cluster;
(e) storing said audio message on said server cluster;
(f) a determining whether said at least one receiving client terminal has begun downloading said audio message from said server cluster;
(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;

(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;

(i) voice changing said audio message prior to transmission from said sending client terminal to said server cluster;

(j) receiving social media credentials from said sending user and storing said social media credentials on said sending client terminal; and (k) transmitting said audio message to a social media network using said social media credentials.

20. A method for audio messaging, comprising;

(a) providing a server cluster;

(b) providing a sending client terminal having a sending user and having the ability to record and transmit audio messages to said server cluster;

(c) providing at least one receiving client terminal having a receiving user and having the ability to download and playback audio messages from said server cluster;

(d) transmitting an audio message intended to be received by said receiving user from said sending client terminal to said server cluster;

(e) storing said audio message on said server cluster;

(f) determining whether said at least one receiving client terminal has begun downloading said audio message from said server cluster;

(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;

(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;

(i) voice changing said audio message prior to transmission from said sending client terminal to said server cluster;

(j) receiving and storing sending client terminal location information;

(k) transmitting said sending client terminal location information to said server cluster;

(l) storing said sending client terminal location information on said server cluster;

(m) transmitting said sending client terminal location from said server cluster to said at least one receiving client terminal; and (n) displaying said sending client terminal location on a visual display.

21. A method for audio messaging, comprising;

(a) providing a server cluster;

(b) providing a sending client terminal having a sending user and having the ability to record and transmit audio messages to said server cluster;

(c) providing at least one receiving client terminal having a receiving user and having the ability to download and playback audio messages from said server cluster;

(d) transmitting an audio message intended to be received by said receiving user from said sending client terminal to said server cluster;

(e) storing said audio message on said server cluster;

(f) determining whether said at least one receiving client terminal has begun downloading said audio message from said server cluster;

(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;

(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;

(i) voice changing said audio message prior to transmission from said sending client terminal to said server cluster;

(j) assigning a sending client terminal trust level selected from the group consisting of a plurality of trust levels ranking from a lowest ranking to a highest ranking;

(k) assigning a receiving client privacy level, said receiving client privacy level selected from the group consisting of a plurality of privacy levels ranking from a lowest ranking to a highest ranking; and (l) comparing said sending client terminal trust level to said receiving client terminal privacy level and allowing downloading of said audio message to said at least one receiving client terminal only if said sending client terminal trust level equals or exceeds said receiving client terminal privacy level and if said at least one receiving client terminal has not blocked said sending client terminal.

22. A method for audio messaging, comprising;

(a) providing a server cluster;

(b) providing a sending client terminal having a sending user and having the ability to record and transmit audio messages to said server cluster;

(c) providing at least one receiving client terminal having a receiving user and having the ability to download and playback audio messages from said server cluster;

(d) transmitting an audio message intended to be received by said receiving user from said sending client terminal to said server cluster;

(e) storing said audio message on said server cluster;

(f) a determining whether said at least one receiving client terminal has begun downloading said audio message from said server cluster;

(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;

(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;

(i) voice changing said audio message prior to transmission from said sending client terminal to said communication server;

(j) receiving social media credentials from said sending user and storing said social media credentials on said first client terminal; and (k) transmitting said audio message to a social media network using said social media credentials;

(l) receiving and storing sending client terminal location information;

(m) transmitting said sending client terminal location information to said server cluster;

(n) storing said sending client terminal location information on said server cluster;

(o) transmitting said sending client terminal location from said server cluster to said at least one receiving client terminal; and (p) displaying said sending client terminal location on a visual display.

23. A method for audio messaging, comprising;

(a) providing a server cluster;

(b) providing a sending client terminal having a sending user and having the ability to record and transmit audio messages to said server cluster;

(c) providing at least one receiving client terminal having a receiving user and having the ability to download and playback audio messages from said server cluster;

(d) transmitting an audio message intended to be received by said receiving user from said sending client terminal to said server cluster;

(e) storing said audio message on said server cluster;

(f) determining whether said at least one receiving client terminal has begun downloading said audio message from said server cluster;

(g) appending subsequently received audio messages from said sending client terminal to said audio message to form an appended audio message until a maximum appended message duration has been reached, then blocking transmission of further audio messages from said sending client terminal until said appended audio message has begun downloading to said at least one receiving client terminal or until a lockout period has expired;

(h) creating a plurality of appended audio messages by repeating steps d through g until the number of appended audio messages reaches a maximum number, then blocking transmission of further audio messages from said sending client terminal until said appended audio messages have begun downloading to said at least one receiving client terminal;

(i) voice changing said audio message prior to transmission from said sending client terminal to said server cluster;

(j) receiving social media credentials from said sending user and storing said social media credentials on said first client terminal;

(k) transmitting said audio message to a social media network using said social media credentials;

(l) assigning a sending client terminal trust level selected from the group consisting of a plurality of trust levels ranking from a lowest ranking to a highest ranking;

(m) assigning a receiving client privacy level, said receiving client privacy level selected from the group consisting of a plurality of privacy levels ranking from a lowest ranking to a highest ranking; and (n) comparing said sending client terminal trust level to said receiving client terminal privacy level and allowing downloading of said audio message to said receiving client terminal only if said sending client terminal trust level equals or exceeds said receiving client terminal privacy level and if said at least one receiving client terminal has not blocked said sending client terminal.

* * * * *